(12) United States Patent
Walters et al.

(10) Patent No.: US 10,909,479 B2
(45) Date of Patent: Feb. 2, 2021

(54) PERSONALIZED MULTIMEDIA AUTOGRAPHING SYSTEM

(71) Applicants: David Harris Walters, Rockville, MD (US); David M Brooks, Crofton, MD (US)

(72) Inventors: David Harris Walters, Rockville, MD (US); David M Brooks, Crofton, MD (US)

(*) Notice: Subject to any disclaimer, the term of this patent is extended or adjusted under 35 U.S.C. 154(b) by 0 days.

(21) Appl. No.: 16/876,060

(22) Filed: May 17, 2020

(65) Prior Publication Data

US 2020/0327461 A1 Oct. 15, 2020

Related U.S. Application Data

(63) Continuation-in-part of application No. 16/511,037, filed on Jul. 15, 2019, now abandoned, and a
(Continued)

(51) Int. Cl.
*G06F 3/0483* (2013.01)
*G06Q 10/02* (2012.01)
(Continued)

(52) U.S. Cl.
CPC ........... *G06Q 10/02* (2013.01); *G06F 3/0483* (2013.01); *H04W 4/029* (2018.02); *H04W 4/33* (2018.02); *H04W 4/80* (2018.02)

(58) Field of Classification Search
None
See application file for complete search history.

(56) References Cited

U.S. PATENT DOCUMENTS

| | | |
|---|---|---|
| 6,845,361 B1 | 1/2005 | Dowling |
| 7,505,474 B2 | 3/2009 | Walter |

(Continued)

FOREIGN PATENT DOCUMENTS

EP 2913785 A1 2/2014

OTHER PUBLICATIONS

Ally Carter website, "The Dos and Don'ts of book signings," copyright 2010, "https://allycarter.com/2010/05/the-dos-and-donts-of-book-signings", pp. 1-6.

*Primary Examiner* — Maikhanh Nguyen

(57) ABSTRACT

This invention provides the end-to-end control, networking, and data management for information presentation services and collaboration services. The invention provides for identification of events, generation of push invitations to such events, personalization of ebooks via reader-author collaboration to embed Personalized Multimedia Autographs (PMAs) into the ebook or other media, event line control allowing readers to browse the bookstore, buy while wait, or mingle while waiting for collaboration with the author during these events and capability for the readers and author to discuss the event on social media after the readers have registered for the event enabling the author to provide tailored comments at the event to the readers' interests. This invention may be implemented using several embodiments ranging from small local venues conducting a single author signing to large venues conducting many author presentations and signings in parallel.

20 Claims, 26 Drawing Sheets

Related U.S. Application Data continuation-in-part of application No. 15/425,264, filed on Feb. 6, 2017, now abandoned.

(60) Provisional application No. 62/294,341, filed on Feb. 12, 2016.

(51) Int. Cl.
*H04W 4/029* (2018.01)
*H04W 4/80* (2018.01)
*H04W 4/33* (2018.01)

(56) References Cited

U.S. PATENT DOCUMENTS

| | | |
|---|---|---|
| 7,729,945 B1 | 6/2010 | Katz |
| 8,315,909 B1 | 11/2012 | Barker |
| 8,520,025 B2 | 8/2013 | Patterson |
| 8,533,003 B2 | 9/2013 | Mueller |
| 8,606,644 B1 * | 12/2013 | Bruckhaus ............ G06Q 10/02 705/26.1 |
| 8,712,857 B1 | 4/2014 | Adomato |
| 8,880,602 B2 * | 11/2014 | Dougherty ............ G06F 21/64 709/204 |
| 8,898,587 B2 | 11/2014 | Patterson |
| 9,152,629 B1 * | 10/2015 | Waters .................... G06F 16/93 |
| 10,301,119 B2 | 5/2019 | Wang et al. |
| 2003/0018524 A1 | 1/2003 | Fishman |
| 2006/0136344 A1 | 6/2006 | Jones |
| 2009/0112680 A1 | 4/2009 | Dovrath |
| 2013/0254284 A1 * | 9/2013 | Dougherty ............ G06F 21/64 709/204 |
| 2015/0378533 A1 * | 12/2015 | Landau .................. G06Q 50/01 715/776 |
| 2016/0104229 A1 | 4/2016 | Craft |
| 2016/0345127 A1 | 5/2016 | DeWitt |
| 2017/0124888 A1 * | 5/2017 | Taylor .................... G09B 3/00 |
| 2017/0286220 A1 | 10/2017 | Gerhard et al. |

* cited by examiner

FIG. 11
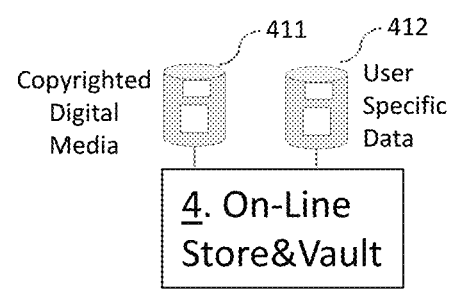
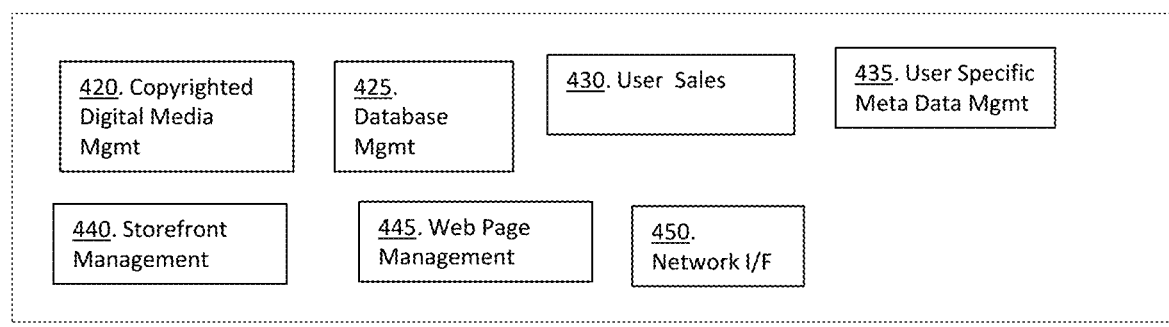

FIG. 14

Event: "A New Black Falcon" Book Signing

Author: Dash Hemmings IV

Twitter Hashtag: #FalconTalk

Location:
  Mysteries Unlimited Bookstore
  @PMA_MysteriesUnlimitedSF
  1000 1st St
  YourCity, YourState 99999
  415-999-0001

Reader Name: Lillian Smith

Reader Email: lsmith2000@gmail.com eBook Available for Download click here

PMA Request: Confirmed

Special Services 
  1. Reserved Seating Ticket (Reader, Guest)
  2. Chardonnay Deluxe (2)
  3. Author Memorabilia Pen Set Attendees: 2

Confirmation Number: 84583549AHGYTR

15

My
Favorite
Mystery
Stories
 16

My Publisher
New York, NY

PERSONALIZED MULTIMEDIA AUTOGRAPHING SYSTEM

1 RELATED APPLICATIONS

This application is a continuation-in-part of U.S. Non-provisional application Ser. No. 16/511,037 filed on Jul. 15, 2019 which is a continuation-in-part of U.S. Non-provisional application Ser. No. 15/425,264 filed Feb. 6, 2017 which claims priority to U.S. Provisional patent application No. 62/294,341, filed Feb. 10, 2016, entitled Personalized Multimedia Autographing System, all of which are incorporated herein by reference.

2 BACKGROUND OF INVENTION

The introduction of ebooks has thoroughly disrupted the publishing industry and forced the closing of many thousands of "bricks and mortar" bookstores. It has provided phenomenal benefits to readers including: a) more comfortable reading experience using a small tablet sized device with a very sharp, controllable sized font rather than a large, bulky, heavy hardcover book, b.) immediate on-line access to dictionaries, c.) near instant availability of ebook sample chapters, d.) on-line access to information related to the ebook on the Internet using embedded URL references and search engines, e.) elimination of the need for physical storage space for books, f.) lower cost, g.) constant reading quality over time compared to hardcover books whose pages become discolored and spines break or crack.

One disadvantage of ebooks is that the publishing industry has not yet adopted techniques for autographing ebooks by their authors even though ebooks open new opportunities for personalizing autographs. Furthermore, even current procedures for the autographing hardcover books involve readers waiting in lines—time readers could better spend browsing in the "bricks and mortar" store and perhaps making a purchase.

Signing events are conducted in various types of venues. The most common is a meeting area in a local bookstore, but they are also conducted in meeting rooms of libraries, think tanks, and other interested business/non-profit organizations. In addition, such signings are conducted at book expos or book festivals where signings are performed in parallel during day long events at convention center venues.

Therefore, a comprehensive solution is needed to address the autographing ebooks and hardcover books for the modern publishing industry because existing solutions do not provide the services that readers desire.

3 PRIOR ART

The following is a tabulation of prior art that presently appears relevant:

U.S. Patents

| Pat. No. | Kind Code | Issue Date | Patentee |
|---|---|---|---|
| 8880602 | B2 | 2014 Nov. 4 | Dougherty et al. |
| 8898587 | B2 | 2014 Nov. 25 | Patterson et al. |
| 6845361 | B1 | 2005 Jan. 18 | Dowling |
| 7505474 | B2 | 2009 Mar. 17 | Walter |
| 0133283 | A1 | 2008 Jun. 5 | Backer et al. |
| 0047332 | A1 | 2014 Feb. 13 | Liu et al. |
| 8520025 | B2 | 2013 Aug. 27 | Patterson et al. |

-continued

| Pat. No. | Kind Code | Issue Date | Patentee |
|---|---|---|---|
| 8712857 | B1 | 2014 Apr. 29 | Adornato et al. |
| 8315909 | B1 | 2012 Nov. 20 | Barker |
| 8533003 | B2 | 2013 Sep. 10 | Mueller et al. |
| 7729945 | B1 | 2010 Jun. 1 | Katz et al. |
| 9152629 | B1 | 2011 Feb. 21 | Waters et al. |
| 10301119 | B1 | 2019 Jun. 4 | Gollapudi |

U.S. Patent Application Publications

| Publication Number | Kind Code | Publication Date | Applicant of Cited Document |
|---|---|---|---|
| 2003/0018524 | A1 | 2003 Jan. 23 | Fishman et al. |
| 2006/0136344 | A1 | 2006 Jun. 22 | Jones et al. |
| 2016/0345127 | A1 | 2016 May 20 | DeWitt et al. |
| 2009/0112680 | A1 | 2007 Oct. 25 | Dovrath et al. |
| 2016/0104229 | A1 | 2015 Dec. 17 | Craft et al. |
| 2007/0286220 | A1 | 2005 Jun. 14 | Stenning |

Foreign Patent Documents

| Foreign Document Number | Country Code | Kind Code | Publication Date | Appplicant or Patentee |
|---|---|---|---|---|
| EP 2913785 | EP | A1 | 2014 Feb. 27 | Oloeriu |

Other Publications and Sources

Authorgraph website: "www.authorgraph.com". Describes the features of their book signing service.

Ally Carter website, "The Dos and Don'ts of book signings," copyright 2010, "https://allycarter.com/2010/05/the-dos-and-donts-of-book-signings", pages 1-6

The ebook is rapidly replacing the printed physical book. It is much more efficient to download and carry an ebook then to produce, purchase and carry a physical book. There are still people that prefer a physical book due to limitations of the ebook. It is desired that the reader should be able to do everything with an ebook that can be done with a physical book in order to fully replace physical books and encourage ebook adoption. In particular, there is a need to be able to autograph and otherwise customize the book as part of a book signing with the author. This allows the reader to be able to interact with the author who they admire and be able to associate the customization with that interaction.

3.1 Dougherty

While Dougherty et al. describes a method to add an autograph to an ebook, it does not solve the issue of interaction and coordination between the bookstore, author and reader. It also does not address how physical book signings coexist with ebook signings which are intermixed randomly. There is a need for a control and data management system to identify, signup for an event and manage signing events.

3.2 Dovrath

Dovrath et. al. defines queueing methods that pre-establish fixed time slots for each user for a remote (not in person)

event. This queueing method will waste the time of both readers and authors while reducing the number of readers that can be accommodated.

3.3 DeWitt

Dewitt et. al. methods do not work well for book signings where service has been scheduled weeks in advance at a predefined venue. It deals with finding and scheduling a service on demand. It also includes Nested Reservations where a specific reservation is matched one-to-one to each desired service rather than bundled.

3.4 Craft

Craft requires the user to set up a directive specifying an area of interest in order to receive push invitations. There is a need to make push invitations to the user more dynamic without requiring user input while still accounting for the user specific interest.

Craft introduces web crawlers for browsing the web to populate a database for events of interest—corresponding to user directives. He recognizes that the Web is built on HTML, but fails to recognize the specific structure that bookstores and other event signings venues use to display their events—a calendar format

3.5 Paterson

Paterson et al. describes methods to identify whitespace within an ebook and insert an autograph in an ebook, however it also does not provide a complete solution. Issues not addressed include coordination of the parties at the bookstore and sharing the customization across multiple devices.

3.6 Authograph

An existing solution on the market from Authograph is a remote (not in person) solution to sign ebooks in which the autograph is stored in a separate document. The user requests an autograph online and at a later time receives a separate document containing the autograph. It does not deal with the physical bookstore environment or the interaction of all of the parties. The solution does not support multimedia. No solution is provided to manage the autograph—this is left to the reader. Only certain books are supported based on inclusion on the website and the author participation.

3.7 Waters et al.

Waters defines methods of personalizing ebooks and authenticating signatures that result. It does not however address finding and scheduling ebooks signing events. It does not address queue management to minimize the time spent waiting and maximizing the number of readers that can be handled during a period of time. It does not describe methods to manage the interaction of the reader, author or bookstore personnel. Waters also does not describe any method to deal with a mixed environment of physical and ebooks at a signing event.

3.8 Dowling

Dowling describes virtual queueing solutions for a physical resource using smart phones, but does not address the specific needs of managing a queue for autographing in a book store with a mixture of physical books and ebooks or for a two-step process of author talk following by reader signings.

3.9 Walter

Walter describes methods to manage a queue using smart phones to communicate with the person in the queue. However, it does not provide methods to manage a queue for autographing books in a bookstore with a mixture of physical books and ebooks.

3.10 Backer

Backer et al. describes methods to manage a queue using smart phones to communicate with the person in the queue when it's their turn. Again, however, it does not provide methods to manage a queue for autographing books in a bookstore with a mixture of physical books and ebooks.

3.11 Stenning

Stenning queueing is specified to support the scenario where queue members are coming and going at irregular times. Therefore, the queueing algorithms used in Stenning do not meet the needs of a signing event which is a fixed time event.

3.12 Liu

Liu et al. describes methods to attach multimedia data to an ebook. However, it does not provide a method to store this data in a seamless way that can use the current infrastructure provided by ebooks sellers that does not modify the copyrighted ebook.

3.13 Patterson

While Patterson et al. teaches methods to attach video and audio to an ebook. It also does not address how this data is stored and synchronized across multiple user devices.

3.14 Gollapudi

Gollapudi is a location-based approach using contextual hashtags about locations to enable social media interaction with local establishments. It provides the user information of an event or location based on the user location using previously used hashtags about the event or establishment. It does not support the concept of social media interaction dealing with a series of events distributed over a period of time and locations.

3.15 Ally-Carter

While Ally-Carter mentions the author speaking and the author signing at the event, it is not a technical document. It does not address virtual queues or describe a method. Rather it is more like a Miss Manners guide to event signings.

3.16 Prior Art Conclusion

Currently if the reader is interested in a book signing, he would have to search the internet to find where a book signing will occur and then show up unannounced and wait in line in some cases for hours. This is not a user-friendly way of either identifying upcoming book signing or interacting and queuing at the bookstore.

There is no way for an ebook reader to show up at a book signing and have the author personalize his book. The ebook market is large and demands a solution to enable book signings. Additionally, the signing event should allow for a random mix of ebook and physical books.

Existing solutions do not provide the services that customers desire. This invention addresses these needs as described below.

4 SUMMARY OF INVENTION

In its basic form, this invention using electronic means provides Control and Data Management (CD&M) to enable new services for readers of ebooks. However, in its most general application, this invention may be applied to enable other applications that provide equivalent information presentation and collaboration services.

For readers of ebooks, this invention provides the reader with the capability to identify a book signing event of interest; register for the event; purchase an ebook license, hardcover book, as well as related special services or products; capture a media data object necessary to generate a Personalized Multimedia Autograph (PMA); generate a PMA for an ebook without modifying the copyrighted ebook content in a convenient, efficient, and personal manner; store the PMA in an on-line bookstore; display the PMA on demand at a location in the ebook selected by the reader; ensure that the PMA is synchronized among all of the reader's devices; and seamlessly interoperate with hardcover book signing events.

Line control is a key feature of the reader-author collaboration. Rather than waiting in line for the reader's turn to collaborate, the reader is free to browse the venue, purchase venue items, or enjoy the venue food and drink. This shop while wait feature of the invention is a major departure from traditional book signings where readers are required to wait, often in long lines. This is attractive to venue owners because it enables them to sell more merchandise—the underlying goal of book events.

A novel push capability is built into the invention to invite readers to book signing events when they are browsing an on-line bookstore. In cases when it is inconvenient for the author to participate in an in-store event signing, the remote embodiment of the invention enables the reader and author to perform these functions by collaborating over the Internet. The invention also includes a feature to initiate a location independent social media conversation between the author and readers enabling them to discuss the book during the author's book tour.

In addition, the invention is designed to provide special services for event signings of the future. These services may include food, beverage, and memorabilia, as well as support for ticketed events, either complimentary or paid. It is envisioned that some ticketed events may become very exclusive compared to current book signing events. For example, ticketed book signings may charge premium prices, but include deluxe services such as cocktails and dinner with the author in addition to the PMA.

To implement the basic capabilities for ebooks, this invention provides the end-to-end Control and Data Management system (C&DM System) for in-person event signings. Key features of the invention are: portability among user devices, authenticity of author signings, security to ensure only valid use by owners of ebook licenses, security to prevent spoofing by unauthorized individuals, push invitations to readers, synchronization among reader devices, use of imaging, video, and audio technology to generate the PMA, archival of personalized ebooks, and use of standard ebook formats. The C&DM for an in person signing events in this invention manages a special type of virtual queue consisting of two services, 1.) an information delivery service typically an author talk with question and answer session followed by 2.) collaboration service where reader and author collaborate in the creation of PMAs. One aspect of this invention that distinguishes it from the prior art on virtual queues is the use of special types of queue and the techniques required to manage it. If the event is a traditional book signing with an author talk followed by a book signing, the virtual queue is a 2 step queue consisting of one information delivery service and one collaboration service. If the event is a book expo event with multiple presentations and signings conducted in parallel, the virtual queue is multi-step consisting of a mix of information presentations and collaboration services.

The C&DM features three configurable capabilities that increase the power of the invention. First, the invention allows for the Off-Site Completion of the PMA. In this configuration, the author grants permission to the reader for an extended period, e.g., 48 hours, to select the parameters for placement of the PMA. During the reader-author collaboration window, the reader and author generate a photo and caption but do not create the PMA. The reader does that later off-site at a location that is convenient. This feature expedites the collaboration process enabling the author to collaborate with more readers.

The second configurable capability addresses the exceptional case where a book has co-authors. In Service 1, both authors speak and answer questions, and then in Service 2, readers collaborate with each author obtaining two PMA. In this configuration, the invention C&DM provides a prioritization number to the reader for collaboration with each author.

The third configurable capability is Book Expo Application where multiple presentations (Service 1 queues) and multiple signings (Service 2 queues) are conducted at the same venue. In this configuration, the invention operates in its most general form with a multi-step virtual queue replacing the aforementioned 2 step virtual queue. C&DM provides these services to the reader using similar reservation and prioritization methods as for single events, but introduces a compound reservation with multiple events at the same venue.

While the exact functional allocation may vary depending upon the embodiment, e.g., use of a "selfie stick" for capturing photo of reader and author or having a friend use the Reader Media Device to capture a photo of the reader and author, the invention does free the author of all technical functions. This is a key aspect of our invention because our research indicates that the authors have a range of sensitivities in dealing with technology. Some authors are very capable while others want minimal or no involvement. Accommodating the sensitivities of all authors distinguishes our invention from other prior art.

This invention is intended to accommodate all of these ebook cases in a manner that meets readers' needs and is profitable to bookstores, publishers, and authors. However, these C&DM methods virtual queues are applicable to a variety of other applications where an expert gives an introductory talk at a scheduled time to a group of users and then engages in a one on one collaboration with each of the users. The information delivery service may take any number and address any subjects, e.g., instruction on a range of subjects such as needlework, creative writing, art, meditation, or office tools. During the one-on-one collaboration service, the user and expert would collaborate to improve the user's (student's) ability culminating in the creation of an application specific PMA. This might be a photo integrated into the expert's lecture notes or a video presented by the author during the introductory talk. Also, the invention supports this broader set of application with the multi-step extension where multiple sessions are conducted in parallel.

5 BRIEF DESCRIPTION OF FIGURES

FIG. 11 depicts a software block diagram for the 4 On-Line store and Vault.

FIG. 14 depicts the Registration Confirmation Message Display as shown on the 1 Reader Device

6 DETAILED DESCRIPTION

The objective of this invention is to provide the lifecycle Control and Data Management (CD&M) services necessary for the provision of the Service 1 information presentation service and the Service 2 information collaboration service. It may be configured to operate to an arbitrary number of such services or the traditional collaboration of reader and author following an author presentation during on-premises book signings. It is also compatible with traditional autographing of hardcover books as well as other media embodiments described in Section 13.

The lifecycle begins with the invention using electronic means to capture the announcements of Service 1 and Service 2 events and then display this information for readers; it continues through the storage, archival, and retrieval of the PMA. The geographical range of the invention supports a range of venues holding event signings for readers across the United States. Such venues are typically bookstores but may include think tanks, libraries, auditoriums, and other meeting places. The specific venue is not relevant to the invention. What does matter is the size of the venue and that the configuration parameters are set to accommodate venue size, either small or large venue. Rather than being a sequential series of steps, the operation of this invention involves parallel activities. At the top level, it consists of Events Data Collection activity performed in parallel with many local Event at various stages of progress. The Ongoing Data Collection activity is a periodic activity and uses electronic means to retrieve event data (book title, genre, author, ISBN, date, time, location, special services) from participating bookstores and other entities, enter the data into a database, format it for display, and respond to user queries to the database.

Figure 1:
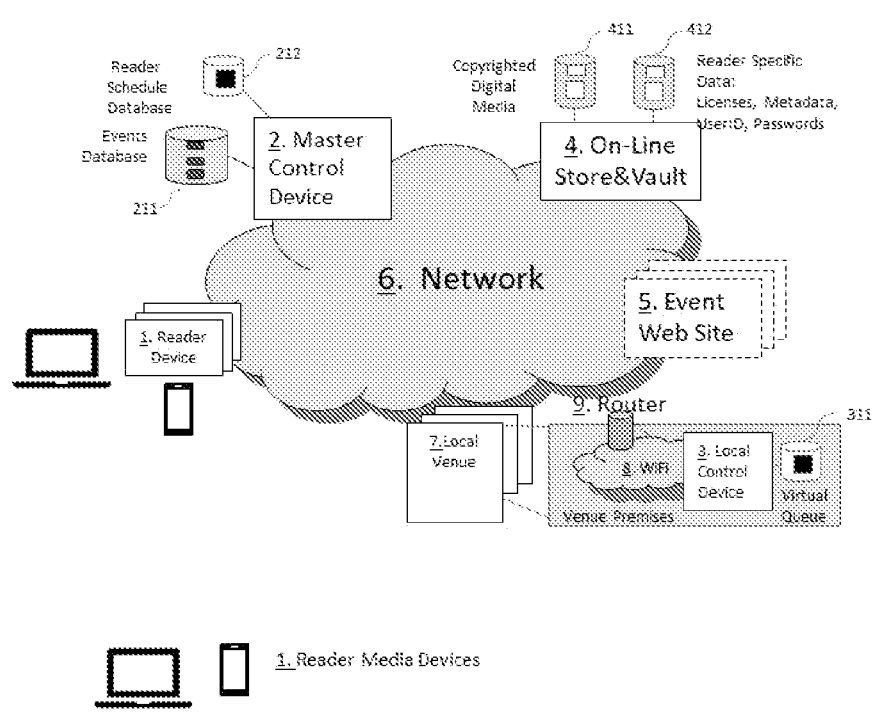
FIG. 1 depicts the System Diagram for the On Premise Embodiment during the Pre-Event phase.

Each local event activity is organized into three phases: Pre-Event, Event, and Post-Event. FIG. 1 depicts the invention embodiment during the Pre-Event phase while the periodic Events Data Collection activity is being performed in parallel. As shown in the figure, the invention system elements comprise: 1 Reader Devices, 2 Master Control Device, 3 Local Control Device resident on premises in the local bookstore conducting the signing event, 4 OLV, 5 Event Web Sites interconnected by a 6 Network, 7 Local Bookstore premises, 8 WiFi in the local bookstore.

The 5 Event Web Sites are the existing sites on the Internet used by bookstores and other entities conducting signing events to advertise these events. The 6 Network is the Internet used by consumers and businesses in the United States for commercial or personal use to perform email, file transfer, web access for such activities as social media, e-commerce, and other electronic media activities. The 8 WiFi is the IEEE 802 standard wireless local area network interconnected to the Internet by a 9 Router.

Also, FIG. 1 depicts the data elements associated with this embodiment. These elements comprise: 211 Event Database and 212 Reader Schedules Database resident at the Master Control Device; 311 Local Schedule for the 3 Local Control Device at each local bookstore; and 411 Copyrighted ebooks and 412 Reader Specific Files resident at the 4 OLV, On-line Store & Vault, including the Multimedia Notes and Highlights files storing the PMA.

The Multimedia Notes and Highlights file is an extension of traditional Notes and Highlights files to accommodate PMAs. In this invention, it is a text file of ebook metadata consisting of:
1. User Inserted Notes
   Formatted text
   Location for insertion of such notes into the ebook
2. User Inserted Coloring of ebook Text or Objects
   Selection of color
   Beginning location and end location of color into the ebook
3. PMA Insertion
   Location for insertion of PMA into the ebook
   Pointer to PMA file(s), i.e., the media data object with the personalized annotations.
4. Other currently supported data.

The Pre-Event phase begins when the event is entered into the database for display to the reader. The activities include:
   Querying the Event Signing Database by the reader to identify events of interest,
   Re-selling of ebook licenses and hardcover books,
   Checking the license of ebooks to validate ownership, Registering validated readers at Signing Events to obtain PMAs, Integrating the registration of the signing event into the reader's personal calendar (so reminder messages will be generated), Providing special services to readers that are event specific and may include reserved seating at Signing Events, pre-paid or complimentary food and beverage service (e.g. coffee or wine service at the event), or author memorabilia (e.g., tee shirts, engraved pen and pencil sets).

The Pre-Event phase ends and the Event Phase begins when the 3 Local Control Device begins execution of a protocol welcoming readers to the signing event by electronic means as described below.

The special services are one feature of the invention designed to attract ebook readers to physical venues such as "bricks and mortar" stores. These services enable the bookstore owner to offer a unique service to readers that will increase reader "traffic" into the store resulting in increased sales.

Figure 2:
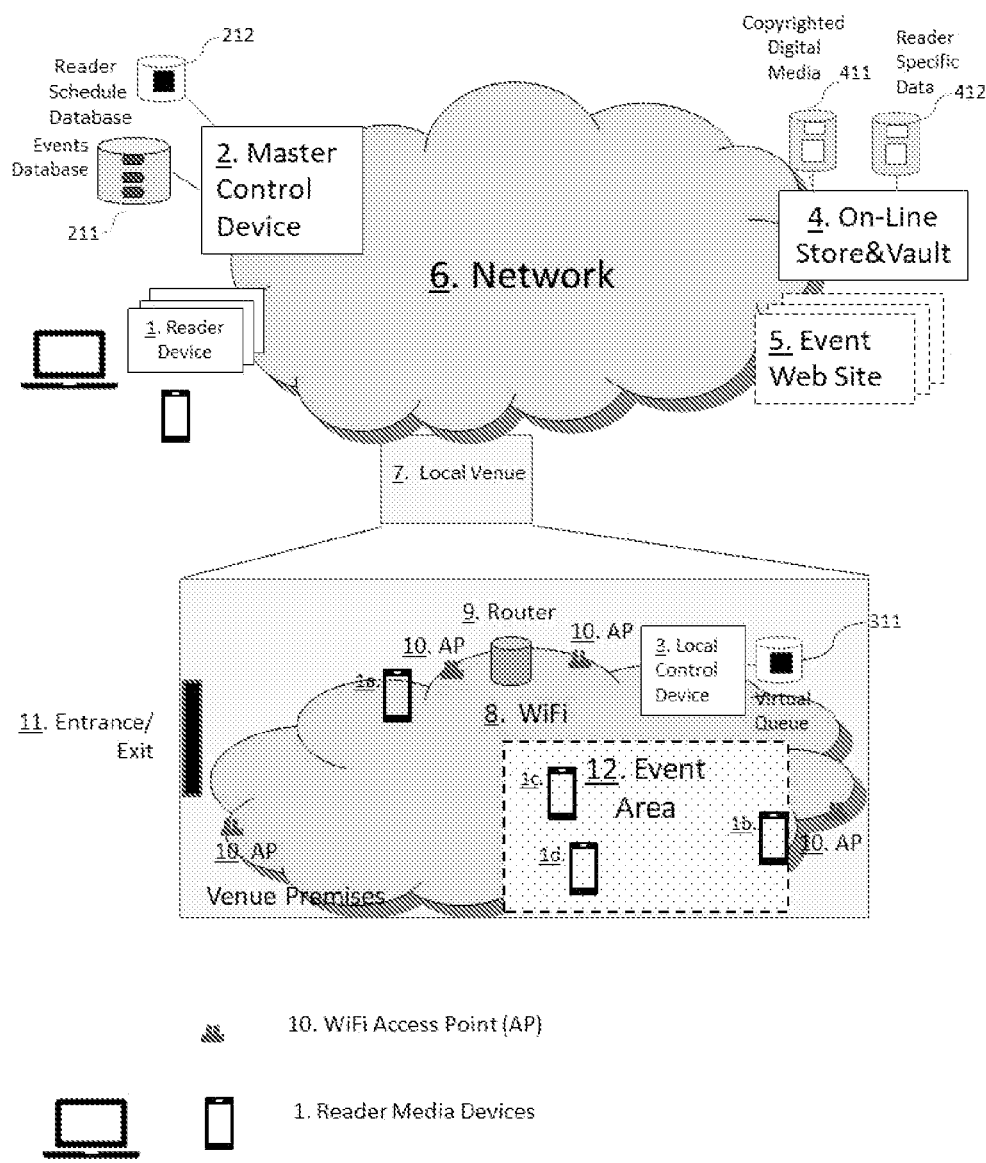
FIG. 2 depicts the System Diagram for On Premise Embodiment during the Event Signing phase when readers arrive at the local bookstore to participate in the event.

FIG. 2 depicts the venue in more detail for illustration of the Event Phase showing the venue 11 entrance/exit and the 12 event area where Services 1 and 2 will be conducted. For convenience, one 11 entrance/exit is shown although there could be more. For example, small venues may have only one or two while convention center venues may have many, e.g., 10 to 20.

As discussed above, the 8 WiFi infrastructure consists of a 9 Router to interconnect to the 6 Internet and 10 Access Points to provide interconnection of the 8 WiFi with 7 venue wired local area networks and execute the triangulation algorithm for calculating position with the 1 Reader Media Device. The number and location of 10 Access Points is configured based on the accuracy required.

The 8 WiFi is a semi-public facility for the patrons of the venue only. The WiFi username and password are openly available for patrons, not required or distributed in a user friendly method, e.g. posted on signs at the venue.

Figure 3:
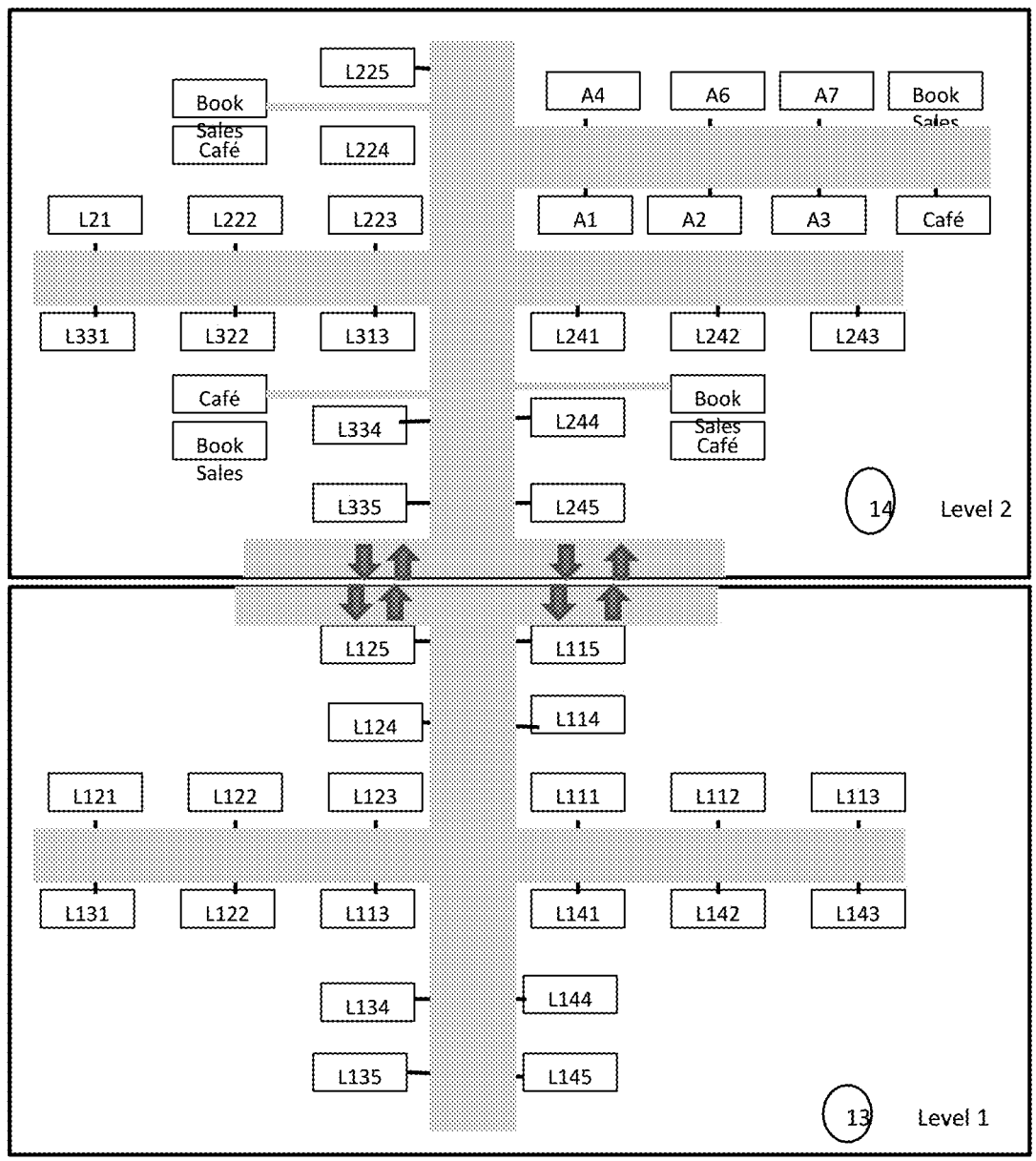
FIG. 3 depicts a conceptual layout of a large venue.

FIG. 3 depicts a conceptual large venue in more detail. It consists of 13 Level 1 and 14 Level 2 each with four quadrants with the levels interconnected by escalators indicated by arrows. On 13 Level 1, there are presentation rooms (L1xx) interconnected by hallways while on 14 Level 2 there are presentation rooms (L2xx), signing areas (Ax), Book Sales areas, and Cafes interconnected by hallways.

The Event Phase begins when Readers (denoted by Readers 1a, 1b, and 1c as shown in FIG. 2) have arrived at the venue to meet the author and participate in the event. The activities include:

Welcoming the reader to the event by electronic means that securely verifies the identity of the reader, Providing a special service such as reserved seating or food and beverage service, Managing the Service 1-Service 2 events consisting of:
1.) the author giving a talk and answering questions and
2.) the author collaborating with readers in generating PMAs, Notifying the reader when the author is ready to sign his/her ebook by electronic means so it is unnecessary for the reader to wait in line, Allowing the reader to select the location in the ebook where the PMA shall be inserted either by pointing or menu selection, Capturing the PMA media data object to be used for the PMA, Annotating the media data object by the author in a personalized manner as requested by the reader to generate the PMA, Generating and storing the PMA in Notes and Highlights file, Storing the PMA at the on-line book store, Synchronizing the PMA on all of the reader's reading devices.

The invention applies to readers who own hardcover books and have smartphones, but they will obtain physical autographs rather than PMAs. However, they will have the benefits of being notified when the author is ready to sign their book and will not have to wait in line.

After the reader and author have collaborated to generate a PMA as described above, the Event Phase has been completed for that reader. The Post Event activities include:

Displaying an icon at the location in the ebook selected by the reader where the PMA is to be displayed, Displaying the PMA on demand when the icon is actuated by tapping, Hiding the PMA upon request by tapping a selected location of the PMA.

When the reader later opens the ebook associated with a particular Service 2 Event on another of his/her devices, the 130 eReader software component, depicted in FIG. 8, will automatically download the updated Multimedia Notes and Highlights File with the PMA from the 4 OLV. This ensures that PMA is available on all of the reader's devices.

This invention is directly applicable to ebooks that have published according to open standards, but it also applicable to ebooks that have published with Data Rights Management Protection. In the latter case, the invention would require access to the protected copyrighted material to insert the PMA.

Figure 4:
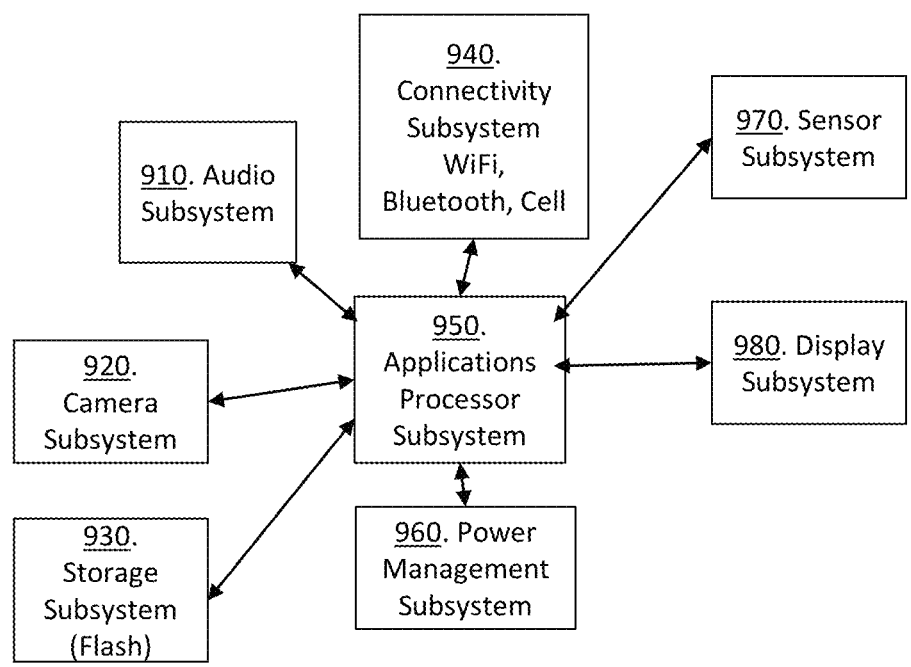
FIG. 4 depicts a generic hardware block diagram for a smartphone embodiment for a 1 Reader Device.

FIG. 4 depicts Smartphone hardware blocks as commonly implemented for a 1 Reader media device. The 910 audio subsystem provides functionality that includes a microphone device to capture, format and input audio and a playback system with a speaker to play audio. The 920 camera subsystem includes cameras (typically both front and rear) that allow video capture, still frame images and video conferencing. The 930 storage system allows appropriate data to be persistently stored to the device. This data includes the operating system (OS), applications (Apps), and multimedia including ebooks, and other user data. The 940 connectivity subsystem provides all connectivity to the outside world. Examples of connectivity include USB, Wi-Fi, cellular, and Bluetooth. The 950 application processor provides a processing engine to run all the code on the smart phone including the OS and Apps. The Apps include ebook readers as well as the proposed apps to allow PMAs to be implemented. The 960 power management subsystem provides hardware to charge the battery, manage heat and reduce power consumption to extend the battery life. The 970 sensor subsystem provides physical inputs to the platform that are used by the OS and apps. Examples of sensor data include GPS, compass data, orientation, light, temperature and well as finger print reader for authentication. Finally, the 980 display subsystem implements the hardware to display video and enable the touch screen. It is typically a Liquid Chrystal Display (LCD) display with touch sensing and the associated drivers. Several accessories may be used to facilitate the signing process. A commercially available "selfie stick" may be used to facilitate taking a picture with the author. Additionally, a stylus can be used to facilitate the actual inscription/autograph on the touch screen. This will provide a higher resolution than can be achieved via a finger for instance.

Figure 5:
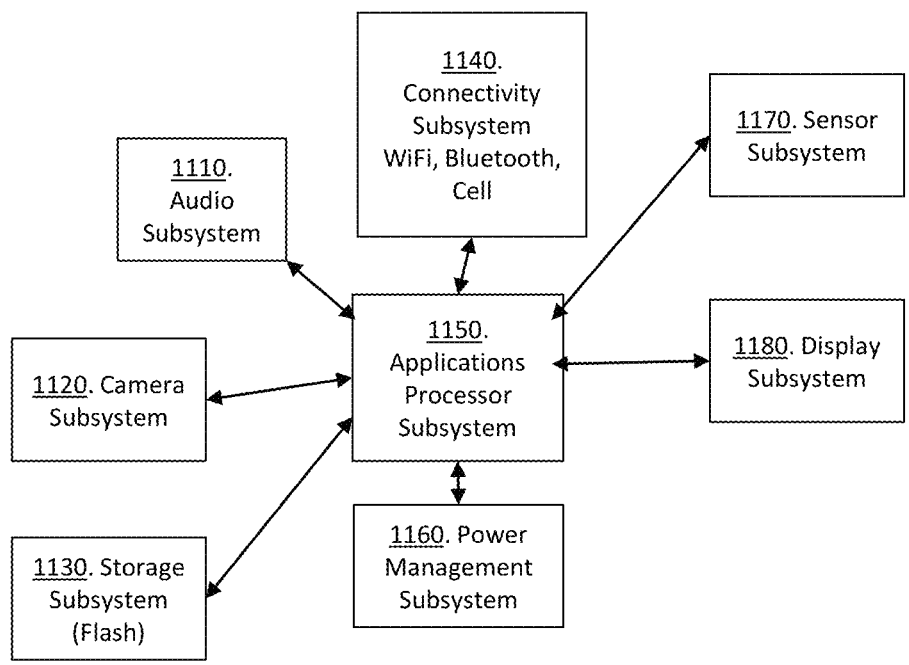
FIG. 5 depicts a hardware block diagram for a tablet computing device embodiment for the 3 Local Control Device. For large venues, the invention may be implemented using multiple tablet devices and the tablet may be used as a graphical front with the processing and storage off-loaded to a cloud server.

FIG. 5 depicts tablet hardware blocks as commonly implemented for the 3 Local Control Device or for 1 Reader Media Device for pre-event and post event activities. The 1110 audio subsystem provides functionality that includes a microphone device to capture, format and input audio and a playback system with a speaker to play audio. The 1120 camera subsystem includes cameras (typically both front and rear) that allow video capture, still frame images and video conferencing. The 1130 storage system allows appropriate data to be persistently stored to the device. This data includes the operating system (OS), applications (Apps), and multimedia including ebooks, and other user data. The 1140 connectivity subsystem provides all connectivity to the outside world. Examples of connectivity include USB, Wi-Fi, cellular, and Bluetooth. The 1150 application processor provides a processing engine to run all the code on the smart phone including the OS and Apps. The Apps include ebook readers as well as the proposed apps to allow PMAs to be implemented. The 1160 power management subsystem provides hardware to charge the battery, manage heat and reduce power consumption to extend the battery life. The 1170 sensor subsystem provides physical inputs to the platform that are used by the OS and apps. Examples of sensor data include GPS, compass data, orientation, light, temperature and well as finger print reader for authentication. Finally, the 1180 display subsystem implements the hardware to display video and enable the touch screen. It is typically a Liquid Chrystal Display (LCD) display with touch sensing and the associated drivers.

Figure 6:
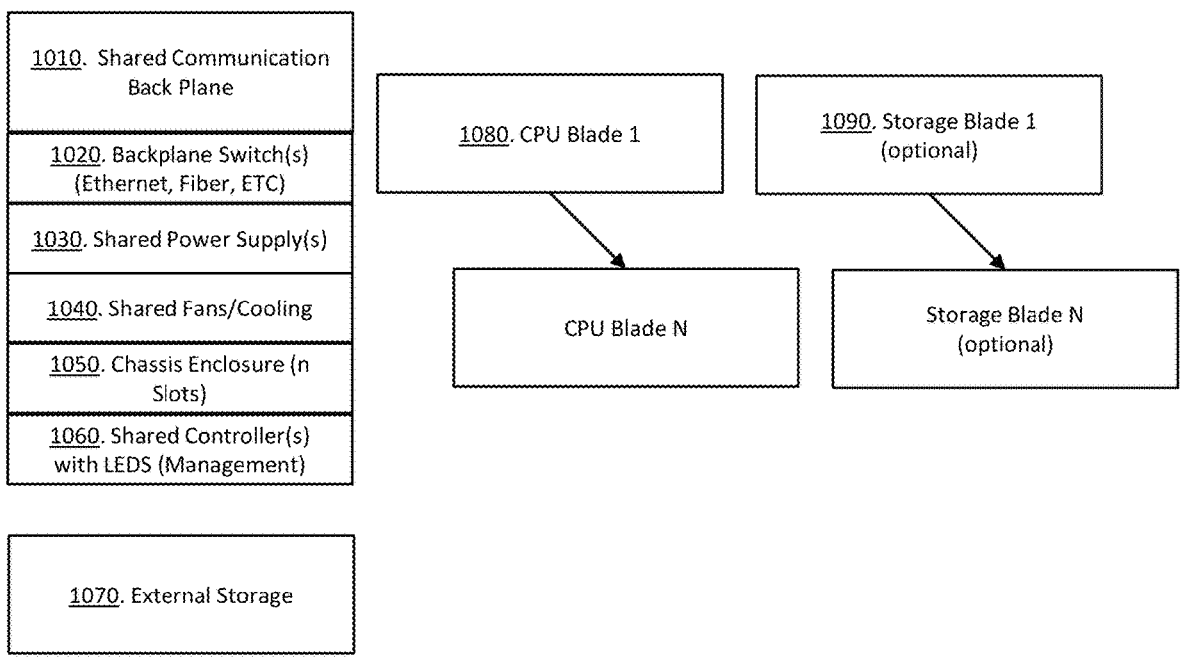
FIG. 6 depicts a generic hardware block diagram for a Cloud Server embodiment for the 3 Master Control Device and the 4 On-Line store and Vault (OLV).
Figure 7:
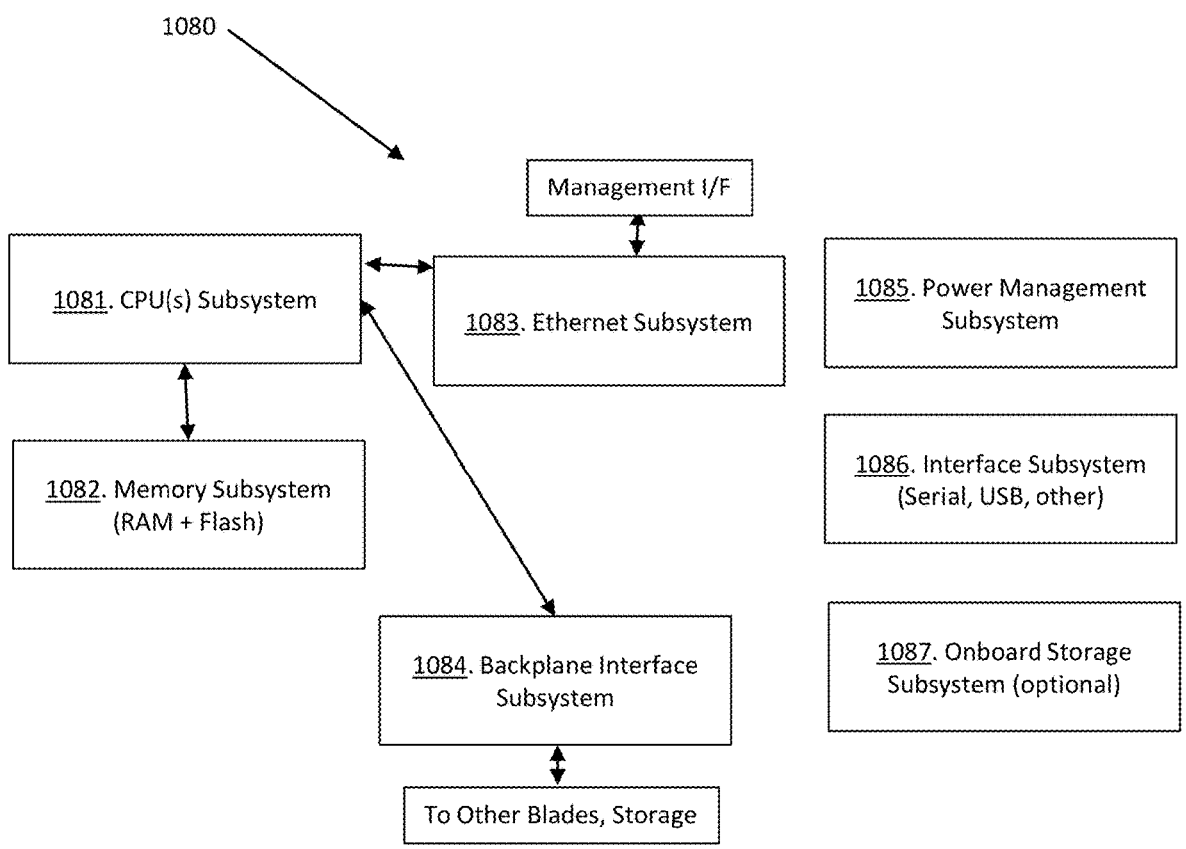
FIG. 7 depicts a 1080 CPU Blade in more detail for a Cloud Server embodiment for the 3 Master Control Device and 4 On-Line store and Vault.

FIGS. 6 and 7 depict a typical Cloud Computing platform as commonly used for server devices such as the Master Control Device in this embodiment and the Local Control Device in alternative embodiments. These figures show one hardware embodiment with many variations possible. The cloud platform is a large number of servers distributed geographically for redundancy and reliability. FIG. 6 shows a single server of which there are many spread across locations. The server consists of a 1010 shared backplane that is used to interconnect the 1080 server blades and optionally 1090 storage blades. A 1020 backplane switch is provided to switch data between the blades and can use Ethernet, fiber or other physical interconnects for that purpose. A 1030 shared power supply(s) provides appropriate power to the blades and other components and would be usually redundant to protect against failure. There is also a 1040 shared cooling subsystem consisting of sensors and fans to cool the server. The 1050 physical rack (chassis enclosure) provides slots to hold the blades. There is a shared controller 1060 that manages the rack and provides diagnostic information such as statistics and faults. The 1060 shared controller also provides configuration and control of the rack. The rack can hold n blades which are either 1080 CPU blades or 1090 storage blades. The 1070 external storage is used to replace or supplement the internal storage of data.

As shown in FIG. 7 each 1080 server blade is a single board computer. It is composed of a 1081 CPU subsystem which has one or more general purpose processors. The 1082 memory subsystem contains both non-volatile storage such as flash for long term storage and DRAM for temporary storage and code execution. The 1083 Ethernet subsystem provides an interface to the management subsystem as shown in FIG. 7. The 1084 backplane interface connects the blade to other blades and external devices. The 1085 power management subsystem manages the power on the blade providing the proper voltages and minimizes power consumption and manages board temperature. The 1086 interface subsystem provides other interfaces such as serial, USB, and proprietary interfaces. Finally, the 1087 onboard storage optionally provides non-volatile storage that is internal to the blade.

Figure 8:
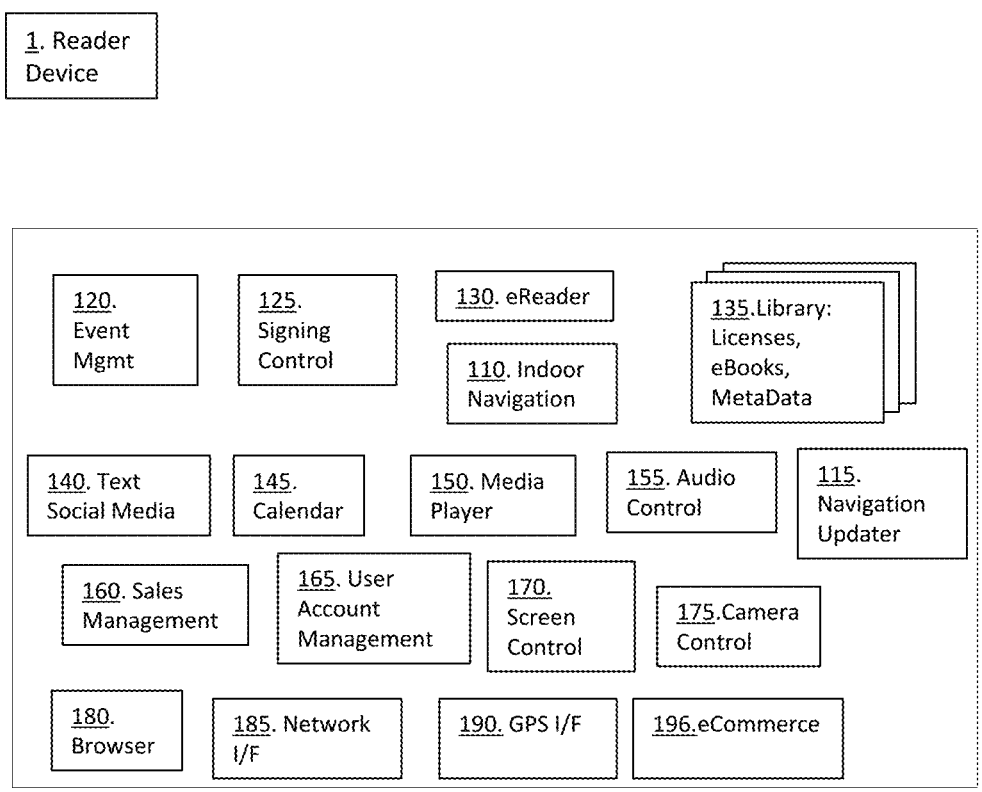
FIG. 8 depicts a software block diagram for the 1 Reader Device.

FIG. 8 depicts 1 Reader Device software implemented as a smartphone app comprising the invention specific app components and commercial components readily available in all smartphones. The major app software components of this invention residing in the 1 Reader Device are the 120 Event Management component to execute the pre-event and event management activities for the reader and the 125 Signing Control component to execute the reader-author collaboration activities at the signing event.

The scope of 120 Event Management activities comprise the querying of the 211 Event Signings Database in the 2 Master Control Device to identify events of interest to reader; registering for such events; interfacing with the 145 Calendar component to generate reminders; interfacing with 160 Sales Management component when the reader desires to purchase either an ebook or hardcover book; coordinating the signing schedule with the 3 Local Control Device at the Signing Event; and providing status to the 2 Master Control Device.

The scope of the 125 Signing Control activities comprises generating the PMA, selecting the location for the PMA to be inserted into the ebook, interfacing with 175 camera control for capture of the image, interfacing with 170 screen control for capture of the personalized annotation, and storing the PMA in the reader's ebook Notes and Highlights file.

The 1 Reader Device software also includes 130 ebook Reader with 135 ebook Library consisting of ebook licenses, ebooks, and ebook metadata. This software is similar to existing eReaders, but it is enhanced to read and store PMAs. Specifically, the 130 eReader component utilized in the invention retrieves the PMA from the reader's Notes and Highlights file to display the PMA in the ebook at a location of the reader's choice. It hides the PMA, when the reader taps an X on the PMA. With this capability, the copyrighted ebook is not changed.

The 160 Sales Management software component is an e-commerce front-end enabling the reader to purchase ebooks and hardcover books via the 4 OLV and to either purchase or obtain special services directly from the local store.

The 165 User Account Management is a user account system provides traditional account management functions for reader access to the 2 Master Control Device and 4 OLV.

The 110 Indoor Navigation component is the software component that helps the user to navigate in large commercial buildings such as a convention center. The map of the facility, expected walking speed and locations of scheduled readers events in x,y,z co-ordinates are downloaded to the 1 Reader Device upon arrival. The 110 Indoor Navigation component provides the user with real time directions to the next location in the building where the reader is registered for a Service. This software makes use of commercially available technology that in most cases is based on the WiFi Certified Location standard as defined by the WiFi Alliance. There are other possible schemes that would be used as well to support this feature and this invention could use any of the commercially available methods that support indoor building navigation.

Wi-Fi Location uses the time-of-flight approach as defined by the Fine Timing Measurement (FTM) protocol in IEEE standard 802.11-2016. FTM calculates an accurate distance from a mobile device to an access point (AP). Each AP in a Wi-Fi Location network is configured with its exact location, including geospatial coordinates (latitude, longitude, and altitude). The number and location of the APs in a facility must be designed to support the desired accuracy. This allows more precise location determination than with other solutions, even in multilevel structures. WiFi Certified Location improves the accuracy of location data to the meter-level thus providing GPS like services inside the building. Given meter level accuracy and average walking speeds of 1.4 meters per second, arrival times can be accurately estimated within 10 seconds. The bigger variation will be from unscheduled stops so the estimated arrival time will be sent regularly to the 3 Local Control Device to account for this.

The 115 Navigation Updater component transmits the position and estimated arrival time of the 1 Reader to the 3 Local Control Device. The rate at which the information is transmitted is configurable by the 3 Local Control Device.

Other software components comprising the 1 Reader Device are readily available on all smartphones: 140 Text and Social Media, 145 Calendar, 150 Media Player, 155 Audio Control, 170 Screen Control, 175 Camera Control, 180 Browser, 185 Network Interface, and 190 GPS Interface.

The 196 eCommerce component in the Reader Media Device implements the Shop While Wait feature of the invention of the invention. It interfaces the camera for scanning identifying codes of items for purchase, converting these codes to digital format, generating purchase request messages, and executing ecommerce transactions.

Figure 9:
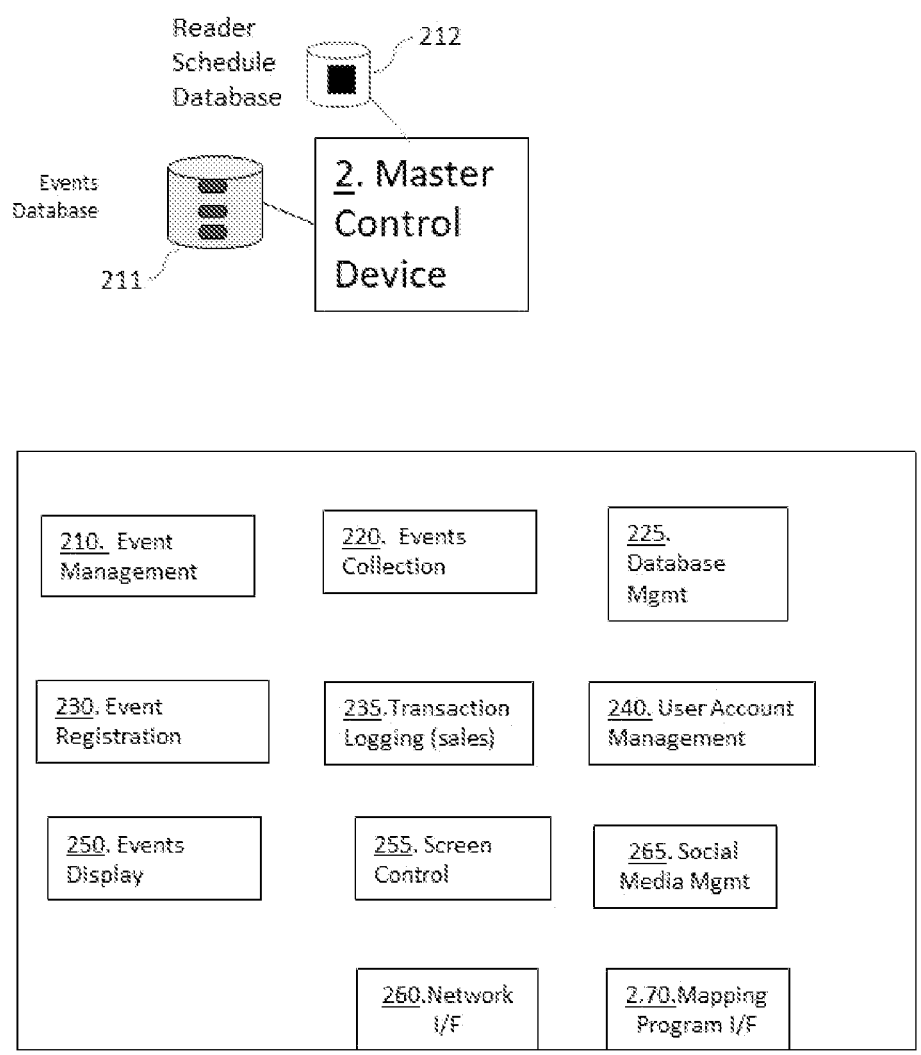
FIG. 9 depicts a software block diagram for the 2 Master Control Device.

FIG. 9 depicts 2 Master Control Device software components comprising the invention components, commercial components readily available in all tablets, and data elements 211 Database of Signing Events and 212 Signing Schedules Database. The invention software components comprise 220 Signing Events Collection, 230 Event Registration, 235 Transaction Logging, 240. Reader Account Management, and 250 Signing Events Display. The novel invention components described below whose operation are described below are the 220 Signing Events Collection and 230 Event Registration components. The 225 Database Management System component with the supporting 211 Database of Signing Events also responds to queries from the 4 OLV to match reader locations and signing events during the generation of "push invitations" to signing events. When matches are identified, the 210 Event Management component generates and transmits the "push invitations" to the 1 Reader Media Device.

Implementing a novel feature of the invention, the 265 Social Media Management component generates the handle and location independent hash tag for insertion into the Registration Confirmation Message transmitted to the 1 Reader Media Device. These parameters identify the social media conversation between the author and readers prior to the event.

For the computation of travel times used in the "push invitation" algorithm, the 270 Mapping Program Interface accesses external mapping software to compute estimated travel times either by driving, walking, or public transportation between the reader location and an event venue.

Figure 10:
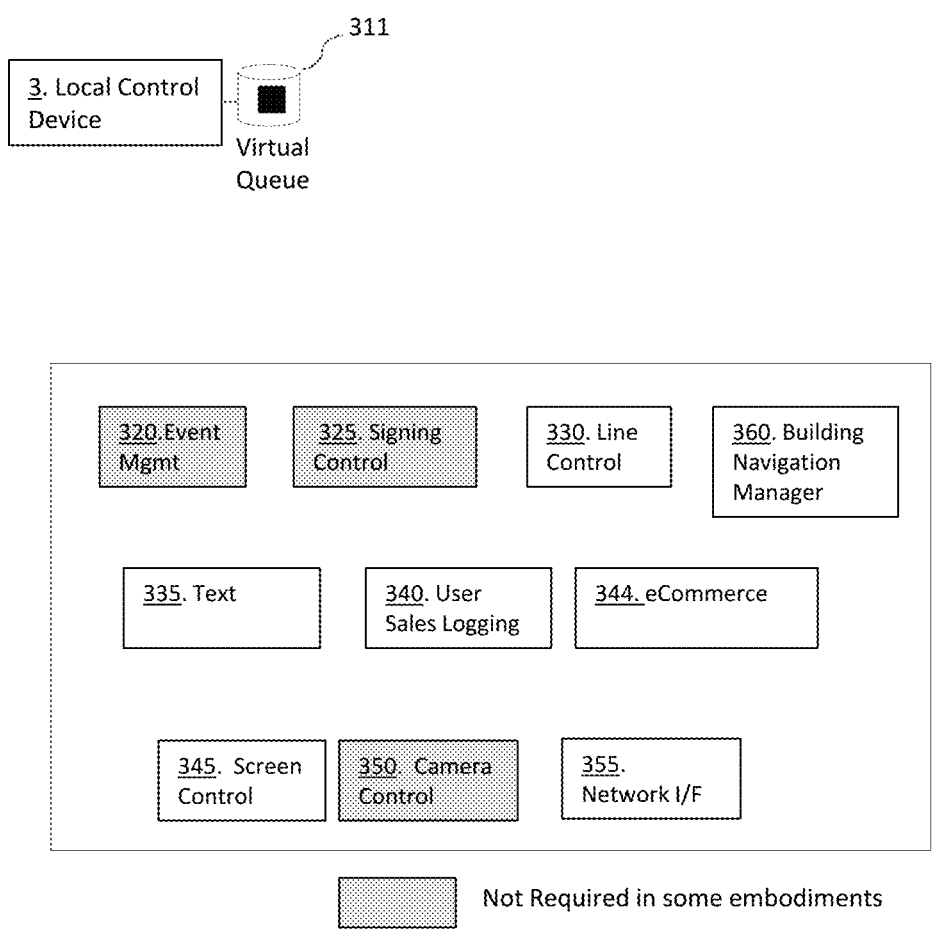
FIG. 10 depicts a software block diagram for the 3 Local Control Device.

FIG. 10 depicts 3 Local Control device software components comprising the invention components, commercial components readily available in all tablets, and 311 Local Signing Schedule(s) for the local store. It maintains the signing schedule for each reader for each of its event scheduled for the local bookstore. During the event, it manages the schedule of signings. The major invention software components comprise 330 Line Control Event Management and 340 Sales Logging. It also includes commercial components 335 Text, 345 Screen Control, 350 Camera Control, and 355 Network Interface. In some embodiments the 3 Local Control Device software components may also include 320 Event Management and 325 Signing Control such as the Remote Embodiment described in Section 9. The 360 Building Navigation Manager receives regular updates from the 1 Reader Device in cases where building navigation is being used. This information includes the location of the reader in the building and the estimated arrival time. In this embodiment, the 3 Local Control Device is responsible for key functions such as line control and author-reader collaboration.

The 3 Local Control Device software may be implemented to accommodate a single simultaneous event or multiple Service 1 and Service 2 events occurring simultaneously.

FIG. 11 depicts the 4 OLV software components comprising the invention components, commercial components, and 411 Copyrighted Digital Media and 412 Reader Specific Data. For the invention, the 4 OLV requires changes only to the 430 User Sales component to perform license validation and 440 Store Front Management for generation and transmission of "push invitations" queries, and to the 412 Reader Specific Data to accommodate the PMA in the aforementioned Multimedia Notes and Highlights file.

7 OPERATION

7.1 Basic Pre-Event Operation

Figure 12:
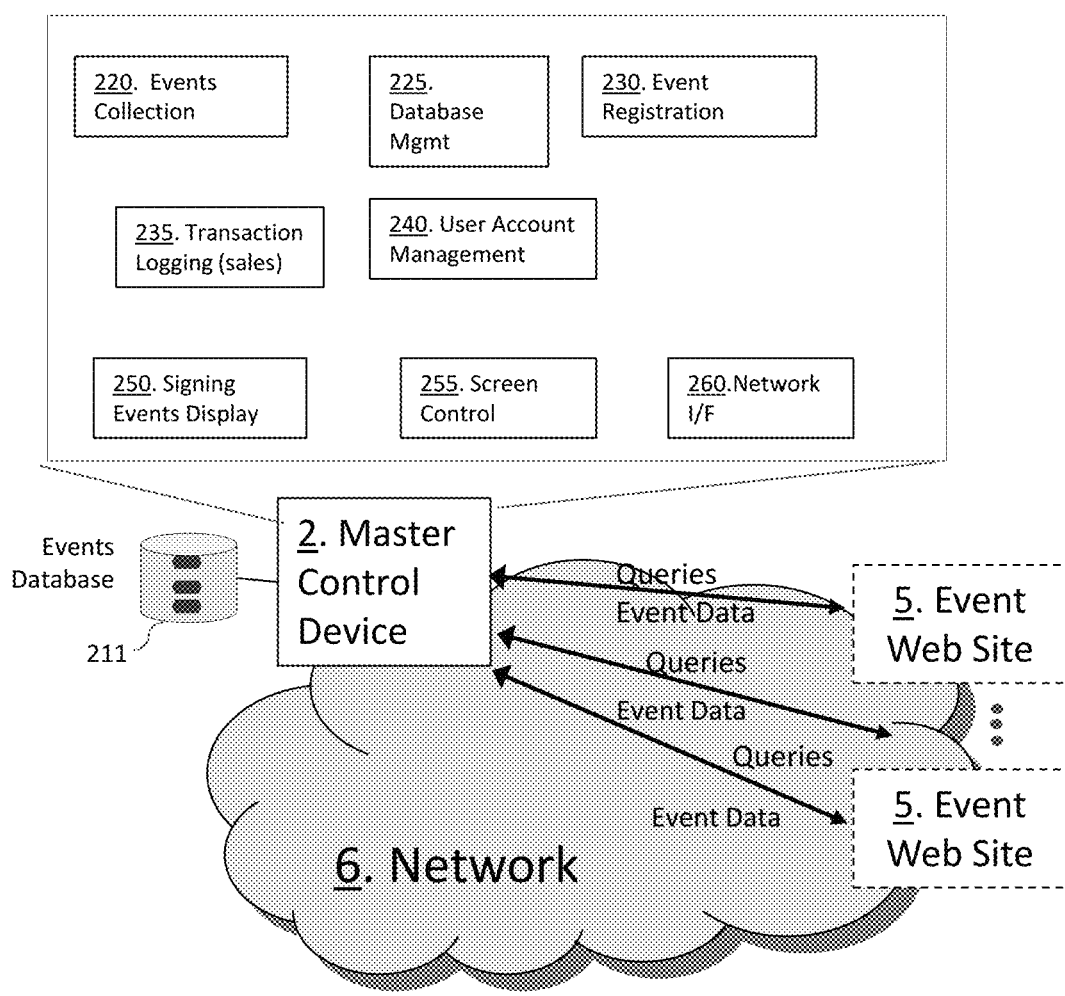
FIG. 12 depicts collection of data for and the generation of the 211 Event Database that consists of Service 1 events, Service 2 events and traditional book signings that combine Service 1 and Service 2 events.

FIG. 12 depicts the periodic Event Data Collection Operation where the 2 Master Control Device queries each of the 5 Event Web sites to determine the current events using electronic means. This step of the invention is implemented using standard network protocols with configured URLs for the 5 Event Web Sites that display the events.

The 220 Signing Events Collection module in 2 Master Control Device transmits a request through the 6 Network using standard protocols to retrieve the current event page from each 5 Event Web Site. In response, the 5 Event Web Site transmits an event file describing the current schedule of events to the 2 Master Control Device. It extracts the Service 1 and Service 2 event data from the schedule stored in calendar format seven days per week twelve months per year for ease of processing.

The 220 Events Collection modules in the 2 Master Control Device parses the calendar data for each author and location, and organize it into Service 1 and Service 2 events, and store them in the 211 Events Database; it checks for new events and updates of events already stored in the database and forwards relevant data to the 225 Database Management System module for storage in the 211 Events Database.

These data elements include but are not limited to ebook title, subtitle, ISBN, author(s), date of signing, time of signing, place of signing, address of signing, related graphic media objects, and (available) Special Services.

In parsing the received event file, the 2 Master Control Device may detect additional URLs, e.g., the full set of Service 1 and Service 2 events could not fit one Web page. The 2 Master Control Device repeats this process for all URLs detected in the parsing.

The 2 Master Control Device queries all 5 Event Web Sites during one update. The timing and frequency of periodic updates are configurable parameters of the invention. The parameters should be set so that the event signing data is reset on a daily basis with minimal performance impact on the performance experienced by the reader.

Figure 13:
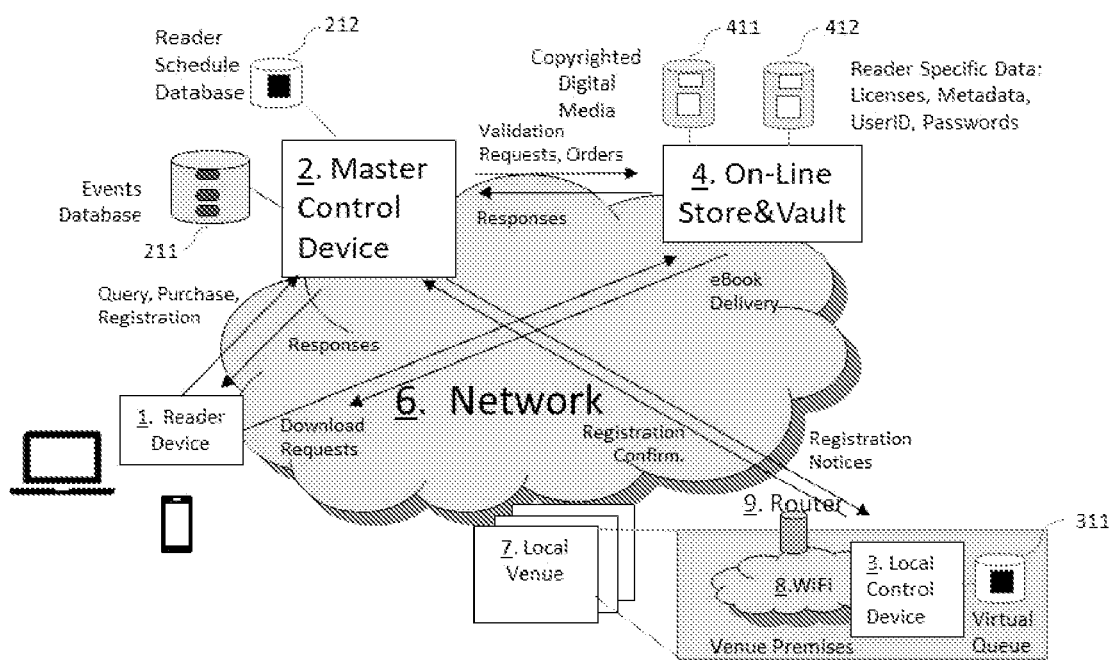
FIG. 13 depicts the Pre-Event phase involving database queries, ebooks or hardover purchases, and event registration activities.

FIG. 13 depicts Pre-Event Operation beginning when the reader opens the app on his/her 1 Reader Device causing the 165 User Account Management component to securely sign in the reader automatically using the reader UserID and password and begin execution of the 120 Event Management component displaying the signing menu options. The reader then enters menu data with parameters comprising geographic area of signing locations, range of dates, and book genre(s) of interest.

After the reader enters such menu data, the 120 Event Management component in the 1 Reader Device receives the input via 170 Screen Control. The 120 Event Management component processes the inputs and transmits a request message through the 6 Network via the 185 Network Interface using standard network protocols to the 2 Master Control Device to query the 211 Event Database. The 250 Signing Display component in the 2 Master Control Device receives the request and queries the 211 Events Database to retrieve the relevant data and generates and formats a response message. It transmits the response through the 6 Network via the 260 Network Interface using standard protocols to the 1 Reader Device for display to the reader with options to register for the events, purchase the books in either ebook or hardcover format, and/or obtain special services. Upon identifying an event of interest, the reader registers for the event in order to obtain a PMA with or without special services. When registering for an event, the reader specifies the number of persons attending the event, e.g., single person, couple. One PMA is generated for each registered event.

The reader may or may not purchase a book for the event because the reader may already own an ebook license. In addition, the reader may make additional queries.

If the reader has selected the option to purchase either an ebook license or hardcover book associated with the signing event and to register for a signing event, an ecommerce transaction is performed with 4 OLV via the 2 Master Control Device. In this case the 160 Sales Management component in the 1 Reader Device extracts the relevant user information from the 165 User Account component and displays the information to the reader via the 170 Screen Control component allowing the reader to edit the data. The reader enters his/her 4 OLV user account and credit information to enable the transaction, e.g. userID, social mediaID (optional), password, credit card information, or payment data. The UserID and password for the 4 OLV and 2 Master Control Device may often be configured to be the same for ease of use, but in some embodiments they may be different.

The 160 Sales Management component then executes the ecommerce transaction to purchase the book and register for the signing event by transmitting a message through the 6 Network via the 185 Network Interface using standard ecommerce protocols to the 230 Event Registration component in the 2 Master Control Device. The 230 Event Registration first performs the ecommerce transaction by extracting the purchase parameters from the message and transmitting a purchase message over the 6 Network to the 4 OLV.

The 430 User Sales component in the 4 OLV executes the transaction by authenticating the reader UserID-password, approving payment, and checking the order for any errors. Inventory would be checked for hardcover orders. It then replies to the 2 Master Control Device with its approval for the purchase and for the ebook provides a URL enabling the reader to retrieve the ebook via the 6 Network. The 2 Master Control Device forwards the response to the 1 Reader Device over the 6 Network. The 235 Transaction Logging component in the 2 Master Control Device logs the transaction.

Then the 230 Event Registration component proceeds with the signing event registration. It generates an event registration message and transmits it through the 6 Network to the 330 Line Control component in the 3 Local Control Device. This message includes the reader name, userID, security parameters (public encryption key of 1 Reader Device), and event parameters (author name, book title, date, time).

Before confirming the registration, the 3 Local Control Device verifies that there is available service capacity to accommodate the reader for the requested for event. For traditional book events, service capacity is seating capacity. If not, the request is rejected.

The 3 Local Control Device Generates a registration confirmation number that may be configured with semantic meaning. Such meaning may include a reader priority to be used in providing special services or in the calculation of the Line Control Number.

The 3 Local Control Device stores the registration in the 311 Virtual Queue and confirms the registration by transmitting a registration confirmation message to the 230 Event Registration component in the 2 Master Control Device. This message provides the reader with a registration confirmation number, social media identifiers (e.g., Twitter name, hashtag) for the event, and other event or facility information (Name, Address, GPS co-ordinates of the bookstore, security parameters (public key) of 3 Local Control Device).

The 2 Master Control Device stores the registration in 212 Reader Schedule database. The 230 Event Registration component then transmits a Registration Confirmation message via electronic means, shown in FIG. 14, to the 120 Event Management component in the 1 Reader Device. The Registration Confirmation message includes ebook title, author, date, time, social media identifiers (e.g., Twitter name, hashtag), reader name, reader UserID, link to download the ebook (if purchased), confirmation of special services (if ordered), venue name, address, GPS co-ordinates, security parameters (public key of 3 Local Control Device, venue WiFi access parameters), autograph page window times, number of attendees, and registration confirmation number. The venue WiFi access parameters may be encrypted with Reader Public Key. It may also include a validation mechanism such as a QR code.

The autograph window time is a configured parameter specifying the allowable begin and end times for the reader for setting the PMA parameters, e.g., location in the ebook (page number, x-y co-ordinates). The window may be constrained to the collaboration time with the author or may start before or may end after.

Upon reader request, the 1 Reader Media Device displays of Registration Confirmation Message contents except for security parameters userIDs, passwords, encryption keys, and the autograph page window times.

The 120 Event Management component adds the event to the reader's personal 145 Calendar for generation of reminder notices to the reader. The app also sets a timer to wake up the 120 Event Management component on the day of the event to check for arrival at the local bookstore and begin execution of the Arrival-Welcome protocol. This timer is set a configurable number of minutes before the scheduled time of the event.

If the reader has selected any Special Services, e.g., reserved seating, complimentary coffee, parameters for these services are included in the registration confirmation message. If the special services require pre-payment such as food and beverage, an e-commerce transaction is performed to select the item and execute the electronic transaction and then such parameters are included in the message.

For ebook purchases, the reader downloads the ebook directly from the 4 OLV to the 1 Reader Device as one would normally do for a traditional ebook purchase. Hardcover books are shipped through normal delivery means or picked up at the bookstore when getting the PMA.

If the reader only selects a signing event of interest to attend and obtain a PMA (no ebook purchase), the reader selects the Register option on the 1 Reader Device display. This requires validation of the reader's ebook license.

For Signing Event Registration, the 120 Event Management component processes and forms an Event Registration message from Account Information and Event Announcement and transmits the message through the 6 Network via the 185 Network Interface using standard protocols to the 230 Event Registration in the 2 Master Control Device. Upon receipt at the 2 Master Control Device, the 230 Event Registration component checks whether the ebook license must be validated. Since the reader has not selected the purchase option in this case, the 230 Event Registration component continues with ebook license validation by transmitting a license validation request message through the 6 Network via the 185 Network Interface using standard protocols to the 4 OLV. The 430 User Sales component in the 4 OLV validates that the reader holds a valid license of the ebook and responds with a message to the 230 Event Registration component indicating that the reader holds a valid license.

After the ebook license has been validated, the 230 Event Registration continues with Event registration as described above. The reader may repeat these actions for additional signing events.

After having registered for a signing event, the reader may select the location for insertion and identifying icon for the PMA during either in the Pre-Event phase or the Event phase by opening the app on the smartphone and selecting the insert PMA menu option. The 125 Signing Control component via 170 Screen Control provides the reader options to either provide textual input page number, x-y co-ordinates (start: upper left, end: lower left) or to open the ebook using the 130 Reader component and point to the desired insertion location. The 125 Signing Control stores the requested insertion location (and size) where the PMA is inserted after the reader and author collaborate to generate the PMA.

The 125 Signing Control component via 170 Screen Control provides the reader options to select the available icons by menu display or to import a graphic image that may be used as the icon. After the reader makes a selection, the 125 Signing Control component stores the requested selection.

In some cases, the reader may not find any signings in the local area. In these cases, the reader may order a signed hardcopy from a non-local bookstore and have it shipped. The purchase and registration functions as describes above; a bookstore rep serves as a proxy to obtain the author signature. The reader may have the signed copy shipped to a home address or to a local address or to a local bookstore (to obtain free shipping and increase traffic to the store).

7.2 Social Media Engagement

After the reader has completed registration for an event, the reader may use social media to engage the author and other readers who will be attending the event. After receiving the Registration Confirmation message, the 140 Text Social Media component in 1 Reader Device is configured to receive text messages based on the 2 Master Control Device social media name for the event sponsor and the event identifier (hashtag). Readers and the author can review and respond engaging in a conversation about the event. Also, the author can tailor his/her comments at the event to the interests of the readers gleaned during the conversation. This conversation continues as the author continues his/her book tour from city to city.

What distinguishes this social media conversation versus other event based social media conversations is that this conversation proceeds as the author continues his/her book tour from city to city. It is a location independent conversation based on the location independent subject, namely corresponding to the ebook and evolves as the author speaks to different audiences.

7.3 Push Invitation

Figure 15:
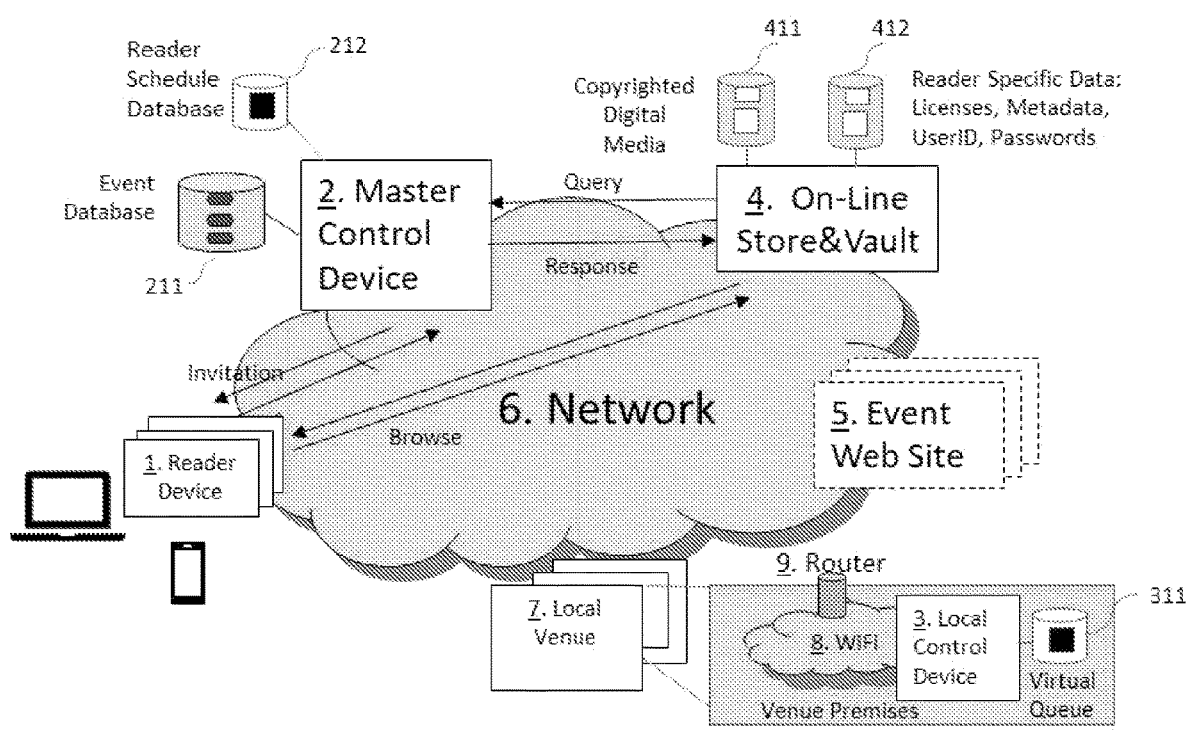
FIG. 15 depicts the OLV issuing a "push invitation" to a local signing event to the reader.

FIG. 15 depicts a reader browsing in the 4 OLV using the web browser in his/her 1 Reader Device to identify books of interest. In this case the reader identifies a book of interest and clicks on it. If the reader is signed into the 4 OLV, the 4 OLV may be able to determine the reader location from the reader profile.

The 440 Storefront Management component in the 4 OLV performs checks to determine if the book is a candidate for Service 1 and/Service 2 events based on genre and publication date. For example, such events are often held for new novels biographies, and current affairs books, but seldom held for new text and reference books. Also, the 440 Storefront Management identifies other related candidate books for events based on the author, book genre, and publication. For example, if the reader has clicked on an espionage book by author David Ignatius, the reader may also be interested in an espionage book by author Daniel Silva. Therefore, if there are recent books by both, they are both candidates for events.

When the 440 Storefront Management identifies candidates for events, it sends a query to the 210 Event Management component in the 2 Master Control Device to determine if there are Service 1 and/or Service 2 events convenient to the reader. The 210 Event Management component queries the 225 Database Management component to check for such events. As a first order of convenience, the 210 Event Management Component checks for events in matching Zip Codes. It then further refines the search using travel time, a configurable parameter, of the reader's location for book identified by the invention algorithm. Travel distance, may be measured by walking, driving, or public transportation travel time, is computed by accessing external mapping software using the 270 Mapping Software Interface.

If there are any such events meeting the convenience criteria, the 2 Master Control Device sends a "Push Invitation" message to the 120 Event Management component in the 1 Reader Media Device inviting the reader to these events.

If the reader is interested in any of these Events offered in the Push Invitations, the reader invokes the registration process for events as described above.

7.4 Basic Event Operation

Since the reader may use smartphones, tablets, portable PCs, or desktop PCs to make reservations, whenever the application is opened on the 120 Event Management checks with the 2 Master Control Device to download and synchronize any reservations that may have been made on any other devices.

This section describes the basic event operation where the invention supports one Service 1 event followed by Service 2 event in a small venue. This corresponds to a traditional event signing.

Figure 16:
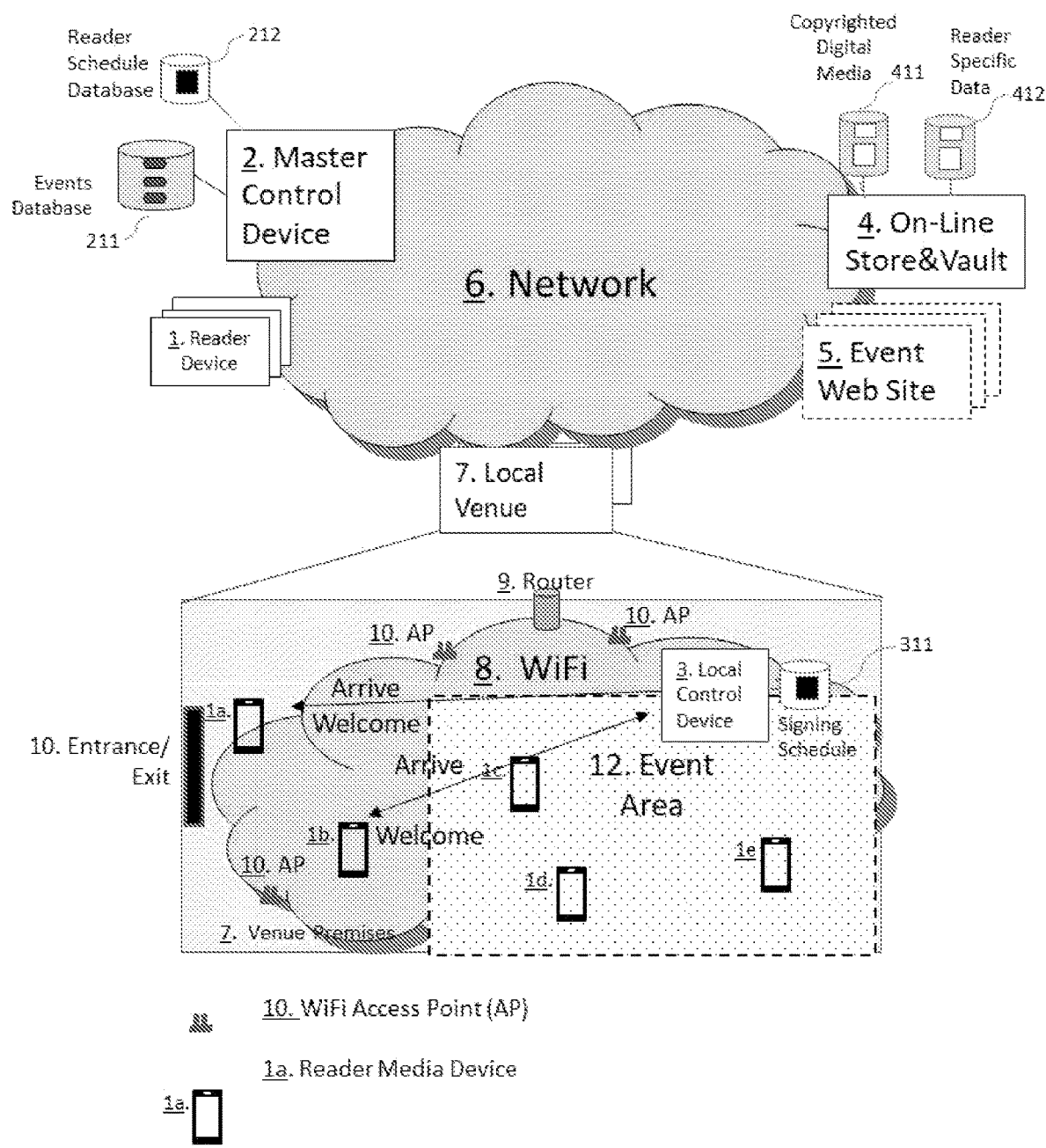
FIG. 16 depicts the Event Phase involving the reader arrival at the event venue.
Figure 17:
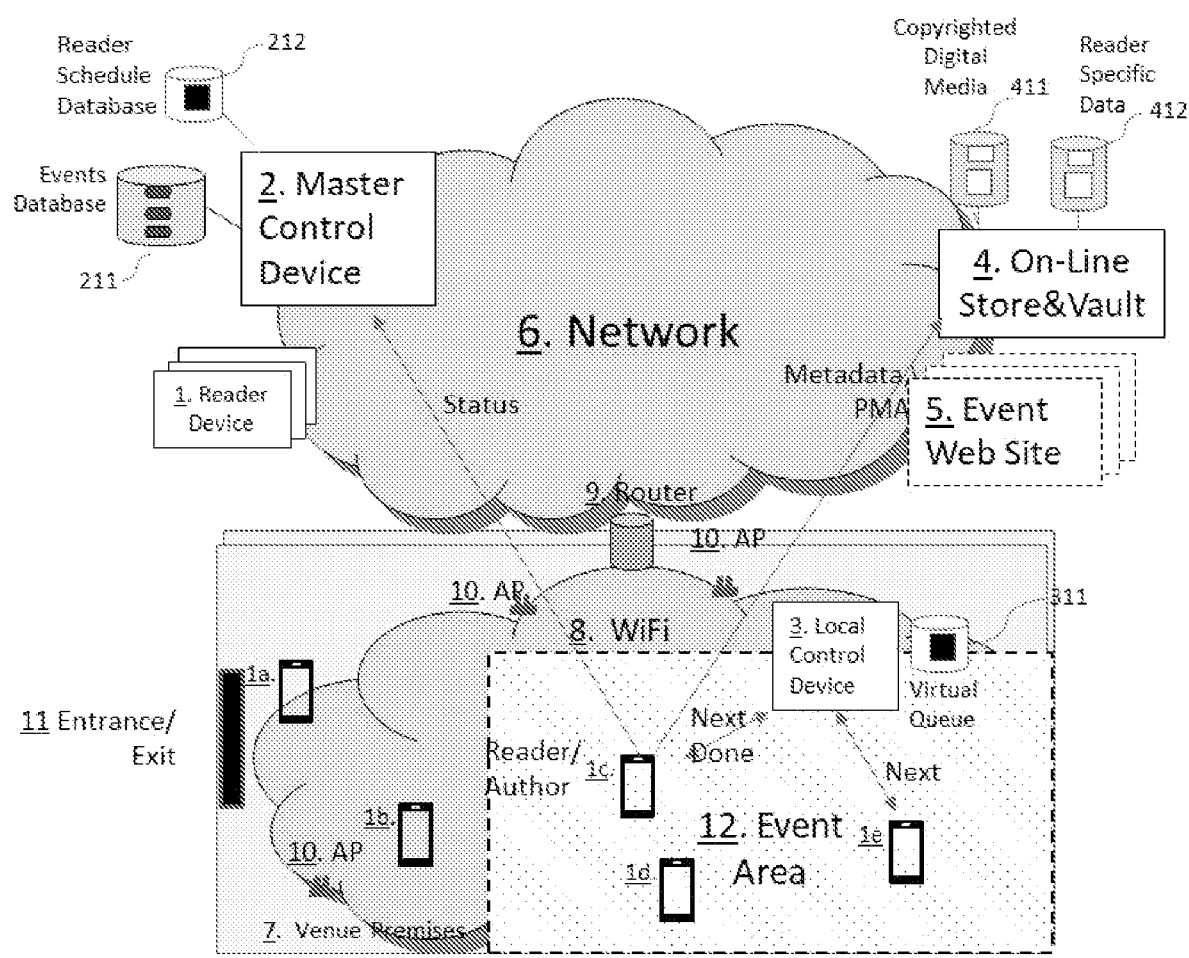
FIG. 17 depicts the Event Phase involving reader and author collaboration to capture and personalize a media data object, and then generate and store the PMA.

FIGS. 16 and 17 depict Reader-Author Collaboration beginning when the reader arrives at the premises of the local premises in FIG. 16 and then collaborates with author in the generation of the PMA in FIG. 17. As noted above, a timer is set to open the 120 Event Management component a configurable number of minutes before the event. The 120 Event Management component accesses 190 GPS Interface of the 1 Reader Media Device to determine its current location and compare it with the location of the co-ordinates of the 7 Local Venue conducting the event. When the difference is within a configurable tolerance, the 120 Event Management component concludes that the reader has arrived at the event and begins execution of the Arrival-Welcome protocol.

For small venues the reader can quickly identify the 12 Event Area upon reaching the 7 Venue. Therefore, the 1 Reader Media Device is not configured to generate indoor position data and send ETAs to the 3 Local Control Device.

The 120 Event Management component in the 1 Reader Device executes the Welcome-Arrival protocol based upon the Bookstore facilities information provided in the Registration message. It transmits an Arrival Message using this media with the Reader's Name, UserID, Event Registration Confirmation Number, Reader Device Hardware ID, Social Media ID of the Signing Event (e.g., Twitter Name, Hashtag), and 1 Reader Device GPS Position to the 3 Local Control Device. Security parameters including the Registration Confirmation Number are encrypted using the reader private encryption key. Then the Arrival Message is encrypted using the 3 Local Control Device public key.

The 1 Reader Device knows the venue 8 WiFi Username-Password either because it has been received in the Registration Confirmation Message or has been stored from previous visits to the venue. In either case, the 1 Reader Device is able to gain access the semi-public 8 WiFi.

The 330 Line Control component in the 3 Local Control Device receives and processes this message. It decrypts the Arrival Message using its private key and decrypts the security parameters using the public key of the reader. It verifies the reader by matching the confirmation number. It updates the 311 virtual queue indicating that reader has arrived and responds with a Welcome Message. This message establishes the unique 1 Reader Device that will be used to generate the PMA.

The 330 Line Control component in 3 Local Control Device also computes and transmits the Line Control Number (LCN) in the Welcome Message to the 1 Reader Device. The LCN establishes the reader's place in queue for signing, e.g., if a reader is assigned an LCN value equal to 3, it will be the third reader to collaborate with the author in the generation of a PMA. The LCN is computed using an algorithm that is configurable based on user set parameters. The parameters may include the arrival time of the reader at the event, priorities derived from the Reservation Confirmation Number, value of the reader's purchase for the event, value of the purchases at the store during the previous year (or some other configurable time). Purchases may include books of any media or any other purchases at the store. The 3 Local Control Device transmits the Welcome Message to the 1 Reader Media Device with security parameters encrypted with the 3 LCD private encryption key and the text of the message encrypted with the 1 Reader Media Device Public Encryption key.

The 3 Local Control Device also alerts bookstore personnel to provide any Special Services to the reader, e.g., provide a purchased hardcopy book, usher to reserved seating, or provide food and beverage service.

The Welcome-Arrival protocol described above is a message based protocol between software components of the invention in the 1 Reader Device and the 3 Local Control Device. It relies on a GPS sensor in the 1 Reader Device, but it does not rely on WiFi sensing of the media access control (MAC) layer address or any other RF sensing. Thus from a networking and communications perspective, it is hardware independent.

After arriving at the bookstore, the reader goes to the "pick up central" location in the bookstore to obtain items purchased via through the special services capability. To obtain these items, the reader uses the 1 Reader Device to display the Event Signing Registration Confirmation Message for bookstore personnel. As described above, the information in this message include the reader's name, email, confirmation number, and the items purchased. The message may also include a mechanism e.g., bar or QR code, for electronic processing so that the bookstore may use electronic means rather than manual reading to validate the order.

Venue personnel then provides the items, e.g., books, beverages, and food. For some more exclusive events, they may also provide tickets and usher readers to their seats.

Readers may configure their app to opt out of using the Arrival-Welcome protocol. In this case, upon arriving at the bookstore, the reader displays the Registration Confirmation message to a bookstore rep and the reader is manually entered into the queue for a PMA and provided and special services that have been purchased.

Figure 18:
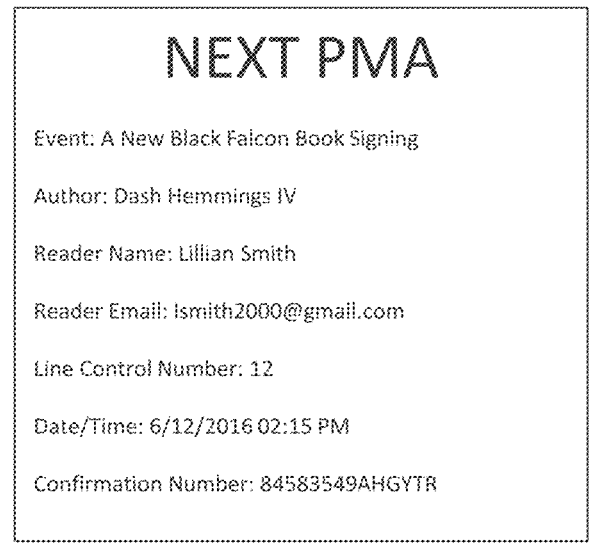
FIG. 18 depicts the Next Message display on the 1 Reader Device indicating the author is ready to collaborate with the reader to generate a PMA.

FIG. 17 illustrates the steps performed in Service 2, creation of a PMA. After the Service 1 has been completed where the venue representative has introduced the author and author has completed a short talk and answered some questions, Service 2 begins. To initiate Service 2 the venue representative executes a command on the 3 Local Control Device. The 330 Line Control component in the 3 Local Control Device sends messages to readers who have registered to obtain PMAs and physical autographs. The reader who is scheduled first receives a NEXT message advising the reader to meet the author in the signing area; it also generates a NEXT message display, shown in FIG. 18, on the reader's smartphone with the event identification information, reader's name, line control number, and time stamp.

When displayed on the reader's smartphone, it also serves to verify the reader is the next person to collaborate with the author to generate a PMA—since there is one and only one person in the Collaboration Window. Thus in our invention, the NEXT message serves two purposes: advisory to alert the reader to begin collaboration and verification to ensure the author is collaborating with the scheduled reader.

The transmission time of the NEXT message establishes the beginning of a Collaboration Window during which the aforementioned unique 1 Reader Device is the only one permitted to generate a PMA with this author. The Collaboration Window ends when the 3 Local Control Device receives a status message receive indicating the PMA generation has been completed.

Other readers receive Status messages indicating their relative position in the signing queue allowing them to browse in the bookstore or enjoy the available food and beverage service. When the reader's position nears the top of the queue, he/she receives a "heads up" status message indicating collaboration with the author is imminent. When the reader's position is at the top of the queue and the author is ready to collaborate, the reader receives the NEXT message. At this time, the reader moves to the signing area to meet the author.

When the reader and author meet in the signing area, the reader uses 1 Reader Device to show the aforementioned NEXT message display to the author validating the reader for the next signing. Then the reader and the author begin collaboration. They use the 1 Reader Device to capture the media data object to be used for the PMA, in one embodiment a JPEG photograph, another an MPEG video clip. The 125 Signing Control component captures the media data object with its interface to 175 camera control. This may include attachments such as a "selfie stick" enabling the reader to easily capture a photo or video of the reader and the author. In an alternative embodiment [See Section 7 on Alternative Control Embodiments], a third person may hold the camera and capture the media object more easily depicting the reader and author.

Once the media object is captured, the reader may use the 125 Signing Control component to invoke various utilities to resize or optimize the coloring of the object. In some cases, the reader may want to take several photos or videos and pick a preferred one for use in the PMA.

After the preferred media data object has been selected, the reader and author collaborate on the personalization. The author enters the personalization inscription typically using a stylus that is captured by 125 Signing Control via 170 Screen Control and integrated with the media data object to form the PMA. It is then displayed to the reader for approval.

For a photo media data object, the author may autograph the photo with the agreed upon inscription. For a video media data object, the reader and author may collaborate to create an introductory frame that would precede the video clip when played. Its contents may comprise: title, time, date, location, names, author signature, and inscription with suitable background coloring and effects.

If the reader approves, the 125 Signing Control stores the PMA in the Multimedia Notes and Highlights file (by reference) for this ebook. It also transmits the PMA and the updated Multimedia Notes and Highlights files over the 6 Network and 8 WiFi using standard network protocols via the 185 Network Interface to the 4 OLV.

The 125 Signing Control component updates the status of PMA by transmitting a message to the 3 Local Control Device and 4 Master Control Device. The 330 Line Control component in the 3 Local Control Device invites the next reader to meet the author in the signing area by transmitting a Next message and updates the status for all other readers waiting for PMAs or hard cover autographs via Status message.

In cases where the reader does not approve of the PMA, the generation of the PMA is repeated. Several iterations are allowed where the maximum number is a configurable parameter.

Figure 19A:
FIG. 19A depicts an e-Book Page displaying a PMA Icon. This is the default view when the PMA is not displayed.
Figure 19B:
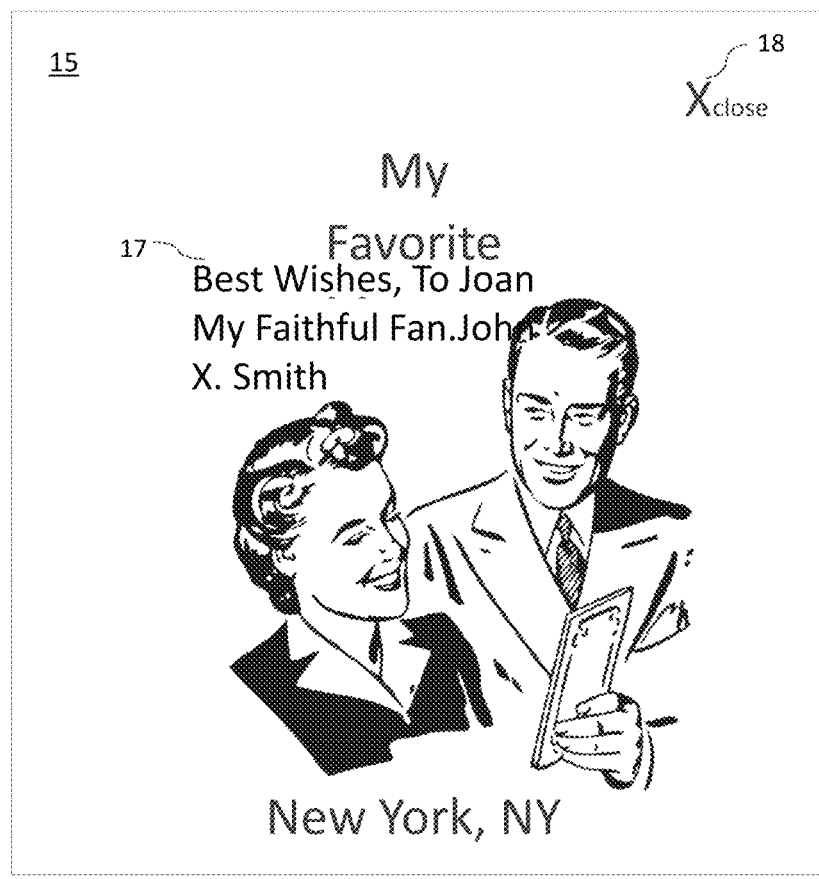
FIG. 19B depicts an ebook page displaying the PMA after tapping the icon. The PMA is hidden when the reader taps the X in the upper right corner of the PMA in this embodiment.

FIG. 19A and FIG. 19B depict a sample ebook with an embedded PMA. First FIG. 19A depicts a view of an 15 ebook page using the 130 Reader software component in the 1 Reader Device after the PMA has been inserted with the 16 orange triangle icon denoting where the exact location of insertion—in this case, the location is on the title page. When the reader touches the 16 orange triangle icon, the 130 Reader component retrieves the 17 PMA, a personalized photo, from the Multimedia Notes and Highlights file and displays it to the reader via 170 Screen Control as shown in FIG. 19B.

In this example the 17 PMA overlaps some parts of textual information on the title page. When the reader touches the large 18 X, the 130 Reader component hides the 11 PMA and displays the title information and 16 orange triangle icon via 170 Screen Control. Note again, the 17 PMA is stored in the ebook Multimedia Notes and Highlights file and ebook copyrighted material is unchanged.

A key feature of the invention is "shop while wait," i.e., readers can roam the venue while in the Service 2 virtual queue and make purchases to the delight of the venue operator. Specifically, the line control that allows the reader to browse the venue book selection or other items for sales such as books, posters, pens, souvenirs, lamps, or other venue items; partake in food and drink; or converse with other readers while waiting for a Service 2 collaboration with an author. Line control will notify the reader with a heads up when they are about to serviced and a NEXT message when they are ready to be serviced. This is in stark contrast to traditional book signings where readers often wait in lines and often leave the event shortly after the signing. Thus readers have less time for shopping at the venue at tradition signings.

Figure 20:
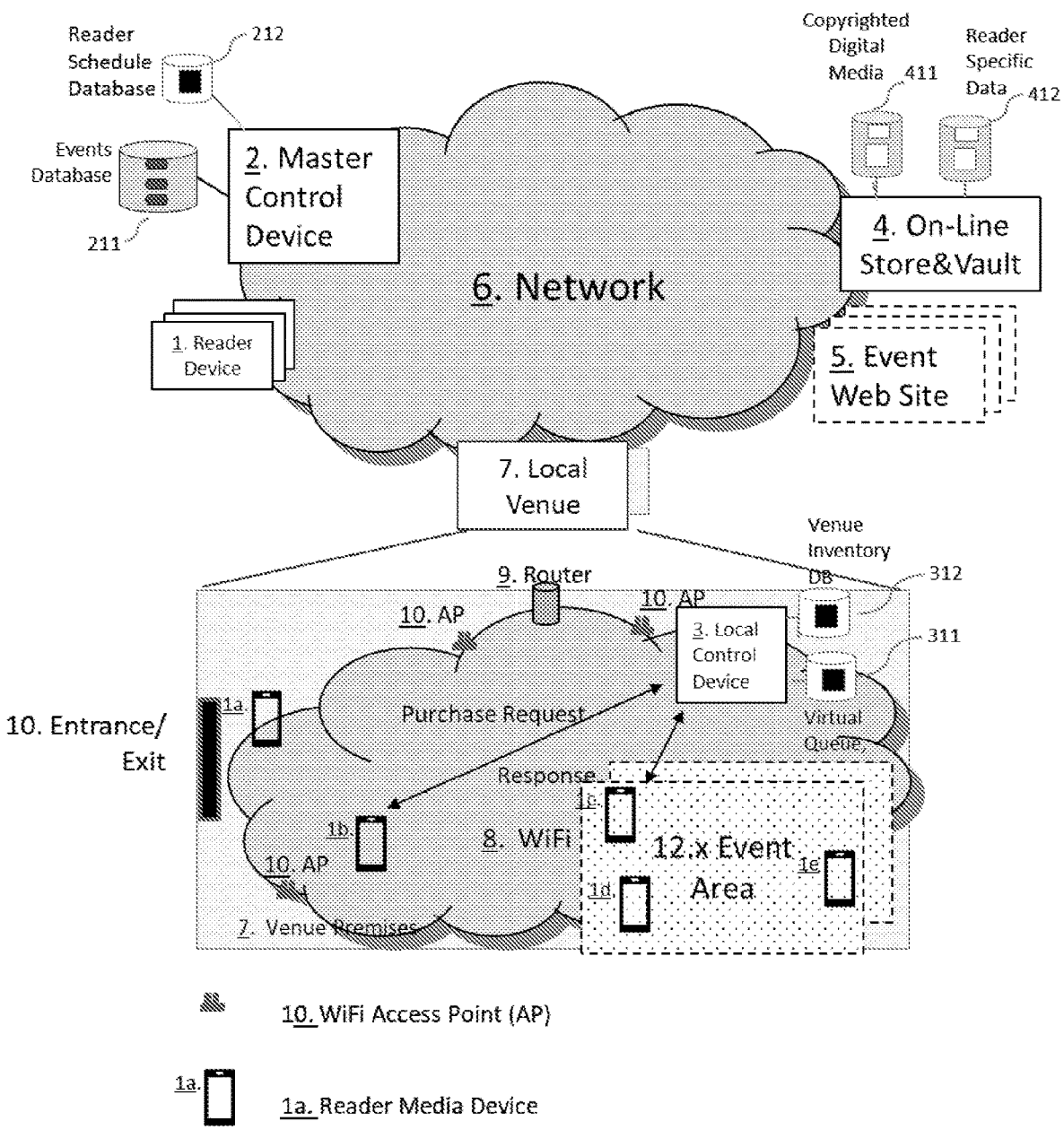
FIG. 20 depicts the Shop While Wait feature.

FIG. 20 depicts the Shop While Wait operations concept. Readers who are in a 311 Service 2 virtual queue may leave the 12 Event Area and roam about the 7 Venue and view the items for sale at the event. If the reader finds an item of interest using 170 Screen Control the reader can use the 196 e-Commerce component in the 1 Reader Media Device to scan an identifying tag on the item such as a bar code or QR code. Such item would typically be a book, but other items are included such as cups, lamps, posters, placards serving as markers for gift cards as well as services.

The 196 e-Commerce component converts the scanned tag into a digital representation. Using 170 Screen Control, the reader enters delivery parameters including format (electronic, physical), quantity, and address (email, physical address, pickup). Then the 1. Reader Media device generates and securely transmits Purchase Request Message with identifying item code and reader LCN to the 3. Local Control Device using the 8 Venue WiFi.

The 344 e-Commerce component in the 3 LCD receives and processes the message. It accesses the 312 Venue Inventory Database to determine the availability and item price and compute a discount on the item if any based on the item cost and other configured parameters including format delivery, quantity, taxes, shipping, and handling. Next it generates and securely transmits a Purchase Request Response message with a discount coupon and item price using the 8 Venue WiFi. The discount count has a configurable expiration time with a minimum the expiration time of the current Service 2 event.

After receiving the message, using 170 Screen Control the reader displays the message on the 1 Reader Media Device, and the reader decides whether to purchase the item. The purchase and delivery may be electronic or physical.

The 3 Local Control Device can also be configured to send push coupons to the Reader Media Device while readers are in a Service 2 virtual queue using an algorithm able to reward readers who have larger LCNs with a greater discount. The push coupon is similar to coupon described above but is transmitted in a message sent by the 3 control Device to the 1 Reader Media Device without a reader request.

In this configuration, the coupon may be applied to selected items or be venue wide, but not to specific items selected by the reader. As configured, it may apply to electronic or physical purchases with a configurable expiration time and delivery format. The reader uses the 1 Reader Media Device to execute the transaction as described above.

Even without providing discount coupons, the Line Control feature of the invention enables readers to shop while waiting in the Service 2 virtual queue, browse the venue items or partake in the café offerings. This is not possible in traditional signings.

7.5 Advanced Event Operation—Co-Authors

The invention may be configured to support events conducted by co-authors where 1.) each author participates in the Service 1 information presentation and 2.) each author in Service 2 collaborates with each reader in the creation of a PMA following Service 1.

When configured to support co-authors, the 330 Line Control component in 3 Local Control Device computes and transmits the Line Control Number (LCN) in the Welcome Message to the 1 Reader Device. For the co-author configuration, there are 311 virtual queues for each co-author. Therefore, the 320 Event Management in the 3 Local Control Device assigns readers as they arrive into one of the queues so that that they are evenly balanced. The 3 Local Control Device transmits the Welcome Message to the 1 Reader Media Device with security parameters encrypted with the 1 LCN, the associated author name, private encryption key with the text of the message encrypted with the 1 Reader Media Device Public Encryption key.

FIG. 17 above illustrates the steps performed in Service 2, creation of a PMA. After the Service 1 information presentation service has been completed by the co-authors, Service 2 begins.

To initiate Service 2 the venue representative executes a command on the 3 Local Control Device. The 330 Line Control component in the 3 Local Control Device sends messages to readers who have registered to obtain PMAs and physical autographs. The readers who are scheduled first with each author receive a NEXT message advising the reader to meet their respective author in the 12 Signing Area; it also generates a NEXT message display, shown in FIG. 18, on the reader's smartphone with the event identification information, reader's name, line control number, author's name, and time stamp.

When displayed on the reader's smartphone, it also serves to verify the reader is the next person to collaborate with the author to generate a PMA—since there is one and only one person in the Collaboration Window with one of the authors. Thus, in our invention, the NEXT message serves two purposes: advisory to alert the reader to begin collaboration and verification to ensure the author is collaborating with the scheduled reader.

The transmission time of the NEXT message establishes the beginning of a Collaboration Window during which the aforementioned unique 1 Reader Device is the only one permitted to generate a PMA with this author. The Collaboration Window ends when the 3 Local Control Device receives a status message receive indicating the PMA generation has been completed.

Other readers receive Status messages indicating their relative position in the signing of the relevant queue allowing them to browse in the bookstore or enjoy the available food and beverage service. When the reader's position nears the top of the queue, he/she receives a "heads up" status message indicating collaboration with the author is imminent. When the reader's position is at the top of the queue and the author is ready to collaborate, the reader receives the NEXT message. At this time, the reader moves to the signing area to meet the author.

When a reader completes collaboration with one author, the reader 320 Event Management in the 3 Local Control Device enters the reader into virtual of the other author and the reader waits for collaboration with that author. If the reader has collaborated with both authors, the reader has completed Service 2.

7.6 Advanced Event Operation—Off-Site Completion of PMA

The invention may be configured to set the autograph page parameters during a configurable time period after the reader-author collaboration has been completed. For example, the time period may be set between 12 to 48 hours. Since this feature of the invention reduces the collaboration time, it allows the author to collaborate with more readers. Also, it enables the reader to complete the PMA off-site in a convenient, relaxed setting.

In the case where the period for selecting the autograph page parameters has been extended beyond the collaboration window, the collaboration window ends when the reader approves the PMA media content (photo and caption). The 125 Signing Control component updates the status of PMA by transmitting a message to the 3 Local Control Device and 4 Master Control Device. The 330 Line Control component in the 3 Local Control Device invites the next reader to meet the author in the signing area by transmitting a Next message and updates the status for all other readers waiting for PMAs or hard cover autographs via Status message.

Figure 21:
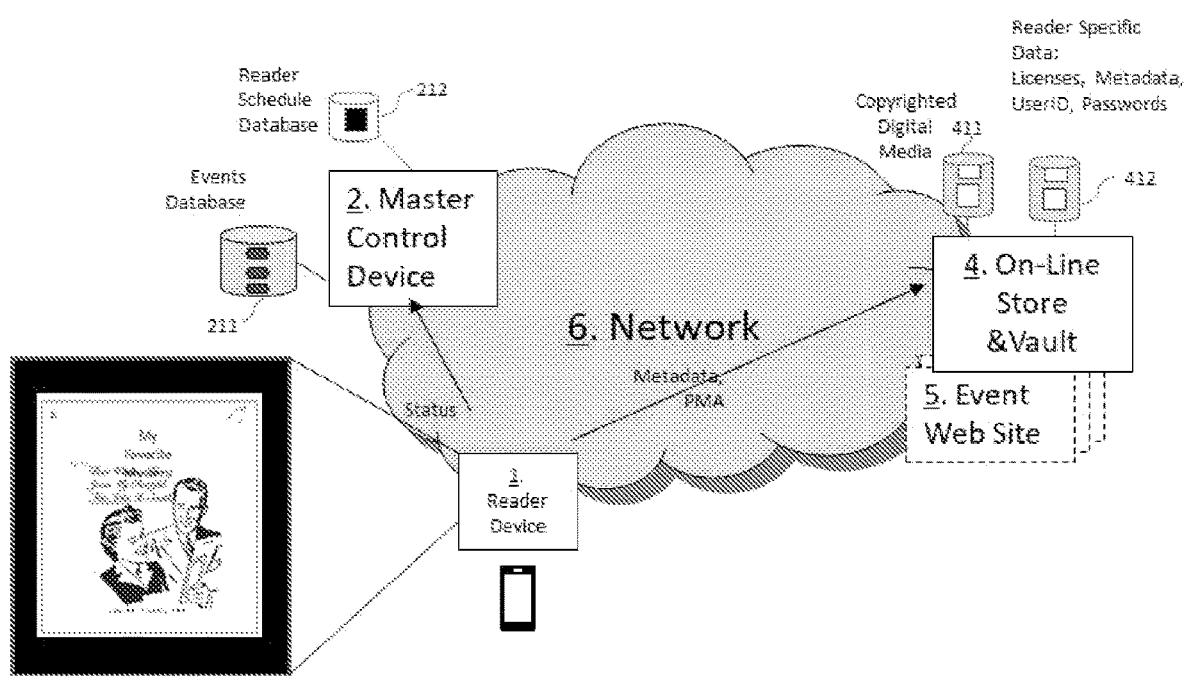
FIG. 21 depicts the Off-Site PMA capability.

The reader with extended time for setting the autograph page parameters exits the 12 Signing Area. When the reader arrives at a convenient location, the reader completes the PMA as shown in FIG. 21

To complete the creation of the PMA, the reader by opens the PMA app on the 1 Reader Media Device selects the insert PMA menu option on the 125 Signing Control component. These options enable the reader to select the location for insertion and the identifying icon. The 125 Signing Control component via 170 Screen Control provides the reader options to either provide textual input page number, x-y co-ordinates (start: upper left, end: lower left) or to open the ebook using the 130 Reader component and point to the desired insertion location. The 125 Signing Control stores the requested insertion location (and size) where the PMA is inserted after the reader and author collaborate to generate the PMA.

The 125 Signing Control component via 170 Screen Control provides the reader options to select the available icons by menu display or to import a graphic image that may be used as the icon. After the reader makes a selection, the 125 Signing Control component stores the requested selection.

The 125 Signing Control stores the PMA in the Multimedia Notes and Highlights file (by reference) for this ebook. It also transmits the PMA and the updated Multimedia Notes and Highlights files over the 6 Network and 8 WiFi using standard network protocols via the 185 Network Interface to the 4 OLV.

7.7 Advanced Pre-Event Operation Book Expo

The invention operates in its most general configuration when it allows the reader to register for an arbitrary mix of Service 1 and Service 2 events at a selected venue. As discussed above for small venues, Pre-Event Operation begins when the reader opens the app on his/her 1 Reader Device causing the 165 User Account Management component to securely sign in the reader automatically using the reader UserID and password and begin execution of the 120 Event Management component displaying the signing menu options. The reader then enters menu data with parameters comprising geographic area of signing locations, range of dates, and book genre(s) of interest. After the reader enters such menu data, the 120 Event Management component in the 1 Reader Device receives the input via 170 Screen Control. The 120 Event Management component processes the inputs and transmits a request message through the 6 Network via the 185 Network Interface using standard network protocols to the 2 Master Control Device to query the 211 Event Database. The 250 Display component in the 2 Master Control Device receives the request and queries the 211 Events Database to retrieve the relevant data and generates and formats a response message. It transmits the response through the 6 Network via the 260 Network Interface using standard protocols to the 1 Reader Device for display to the reader with options to register for the events, purchase the books in either ebook or hardcover format, and/or obtain special services.

In its most general form, the transmitted response may include in a Book Expo event consisting of may Service 1 and Service 2 events being conducted in parallel at the same venue on the same day.

Upon identifying one or more Service 1 and/or Service 2 events of interest, the reader transmits requests to register for these event(s) in order to obtain a PMA with or without special services. When registering for these events, the reader specifies the number of persons attending, e.g., single person, couple. One PMA is generated for each selected Service 2 event.

The reader may or may not purchase a book for the event because the reader may already own an ebook license.

If the reader has selected the option to purchase either an ebook license or hardcover book associated with the signing event and to register for a signing event, an ecommerce transaction is performed with 4 OLV via the 2 Master Control Device. In this case the 160 Sales Management component in the 1 Reader Device extracts the relevant user information from the 165 User Account component and displays the information to the reader via the 170 Screen Control component allowing the reader to edit the data. The reader enters his/her 4 OLV user account and credit information to enable the transaction, e.g. userID, social mediaID (optional), password, credit card information, or payment data. The UserID and password for the 4 OLV and 2 Master Control Device may often be configured to be the same for ease of use, but in some embodiments they may be different.

The 160 Sales Management component then executes the ecommerce transaction to purchase the book and register for the signing event by transmitting a message through the 6 Network via the 185 Network Interface using standard ecommerce protocols to the 230 Event Registration component in the 2 Master Control Device. The 230 Event Registration first performs the ecommerce transaction by extracting the purchase parameters from the message and transmitting a purchase message over the 6 Network to the 4 OLV.

The 430 User Sales component in the 4 OLV executes the transaction by authenticating the reader UserID-password, approving payment, and checking the order for any errors. Inventory would be checked for hardcover orders. It then replies to the 2 Master Control Device with its approval for the purchase and for the ebook provides a URL enabling the reader to retrieve the ebook via the 6 Network. The 2 Master Control Device forwards the response to the 1 Reader Device over the 6 Network. The 235 Transaction Logging component in the 2 Master Control Device logs the transaction.

Then the 230 Event Registration component proceeds with the signing event registration. It generates an event registration message and transmits it through the 6 Network to the 330 Line Control component in the 3 Local Control Device. This message includes the reader name, userID, security parameters (public encryption key of 1 Reader Device), and event parameters (author name, book title, date, time).

Before confirming the registration, the 3 Local Control Device verifies that there is available seating capacity to accommodate the reader for each requested event. For a Service 1 event, capacity is measured in seating capacity while for Service 2 events capacity is measured in number of collaborations. If not, that request for that specific service is rejected.

The 3 Local Control Device Generates a registration confirmation number that may be configured with semantic meaning. Such meaning may include a reader priority to be used in providing special services or in the calculation of the Line Control Number.

The 3 Local Control Device stores the registration in the 311 Virtual Queue file and confirms the registration by transmitting a registration confirmation message to the 230 Event Registration component in the 2 Master Control Device. This message provides the reader with a registration confirmation number, social media identifiers (e.g., Twitter name, hashtag) for the event, and other event or facility information (Name, Address, GPS co-ordinates of the bookstore, security parameters (public key) of 3 Local Control Device).

The 2 Master Control Device stores the registration in 212 Reader Schedule database. The 230 Event Registration component then transmits a Registration Confirmation message via electronic means to the 120 Event Management component in the 1 Reader Device. For each of the selected and confirmed Service 1 and Service 2 events, the Registration Confirmation message includes ebook title, author, date, time, social media identifiers (e.g., Twitter name, hashtag), reader name, reader UserID, link to download the ebook (if purchased), confirmation of special services (if ordered), venue name, address, GPS co-ordinates, security parameters (public key of 3 Local Control Device, venue WiFi access parameters), number of attendees, and registration confirmation number. The venue WiFi access parameters may be encrypted with Reader Public Key. It may also include a validation mechanism such as a QR code.

Figure 22:
FIG. 22 depicts the enhanced Reservation Confirmation message with multiple Service 1 and Service 2 events.

Upon reader request, the 1 Reader Media Device displays the contents of Registration Confirmation Message as shown in FIG. 22 except for autograph page window, security parameters userIDs, passwords, and encryption keys.

The 120 Event Management component adds the event to the reader's personal 145 Calendar for generation of reminder notices to the reader. The app also sets a timer to wake up the 120 Event Management component on the day of the event to check for arrival at the local bookstore and begin execution of the Arrival-Welcome protocol. This timer is set a configurable number of minutes before the scheduled time of the event.

For ebook purchases, the reader downloads the ebook directly from the 4 OLV to the 1 Reader Device as one would normally do for a traditional ebook purchase. Hardcover books are shipped through normal delivery means or picked up at the bookstore when getting the PMA.

If the reader only selects a signing event of interest to attend and obtain a PMA (no ebook purchase), the reader selects the Register option on the 1 Reader Device display. This requires validation of the reader's ebook license.

For Signing Event Registration, the 120 Event Management component processes and forms an Event Registration message from Account Information and Event Announcement and transmits the message through the 6 Network via the 185 Network Interface using standard protocols to the 230 Event Registration in the 2 Master Control Device. Upon receipt at the 2 Master Control Device, the 230 Event Registration component checks whether the ebook license must be validated. Since the reader has not selected the purchase option in this case, the 230 Event Registration component continues with ebook license validation by transmitting a license validation request message through the 6 Network via the 185 Network Interface using standard protocols to the 4 OLV. The 430 User Sales component in the 4 OLV validates that the reader holds a valid license of the ebook and responds with a message to the 230 Event Registration component indicating that the reader holds a valid license.

After the ebook license has been validated, the 230 Event Registration continues with Event registration as described above. The reader may repeat these actions for additional signing events.

After having registered for each Service 2 event, the reader may select the location for insertion and identifying icon for the PMA during either in the Pre-Event phase or the Event phase. There is Pre-Event and Post-Event phase operation operates as describes. Additional detail on the Book Expo Event Phase is presented below.

Also, after having registered for a Service 1 or Service 2 event, a reader may engage in a social media conversation on that event. The invention operates as described above.

7.8 Advanced Event Operation—Book Expo

The advanced event operation supports multiple Service 1 events and Service 2 events conducted in parallel in a large venue. In this configuration of the invention, Service 1 and Service 2 events are each scheduled at specific times contrary to traditional book signings where a Service 2 event follows a Service 1 event. This configuration corresponds to a book expo or festival event that typically conducts Service 1 and Service 2 events over the course of a day.

On the day of the event, a timer is set to open the 120 Event Management component a configurable number of minutes before the first event. The 120 Event Management component accesses 190 GPS Interface of the 1 Reader device to determine its current location and compare it with the location of the co-ordinates of the 7 Local Venue conducting the event. When the difference is within a configurable tolerance, the 120 Event Management component concludes that the reader has arrived at the event venue and begins execution of the Arrival-Welcome protocol.

Figure 23:
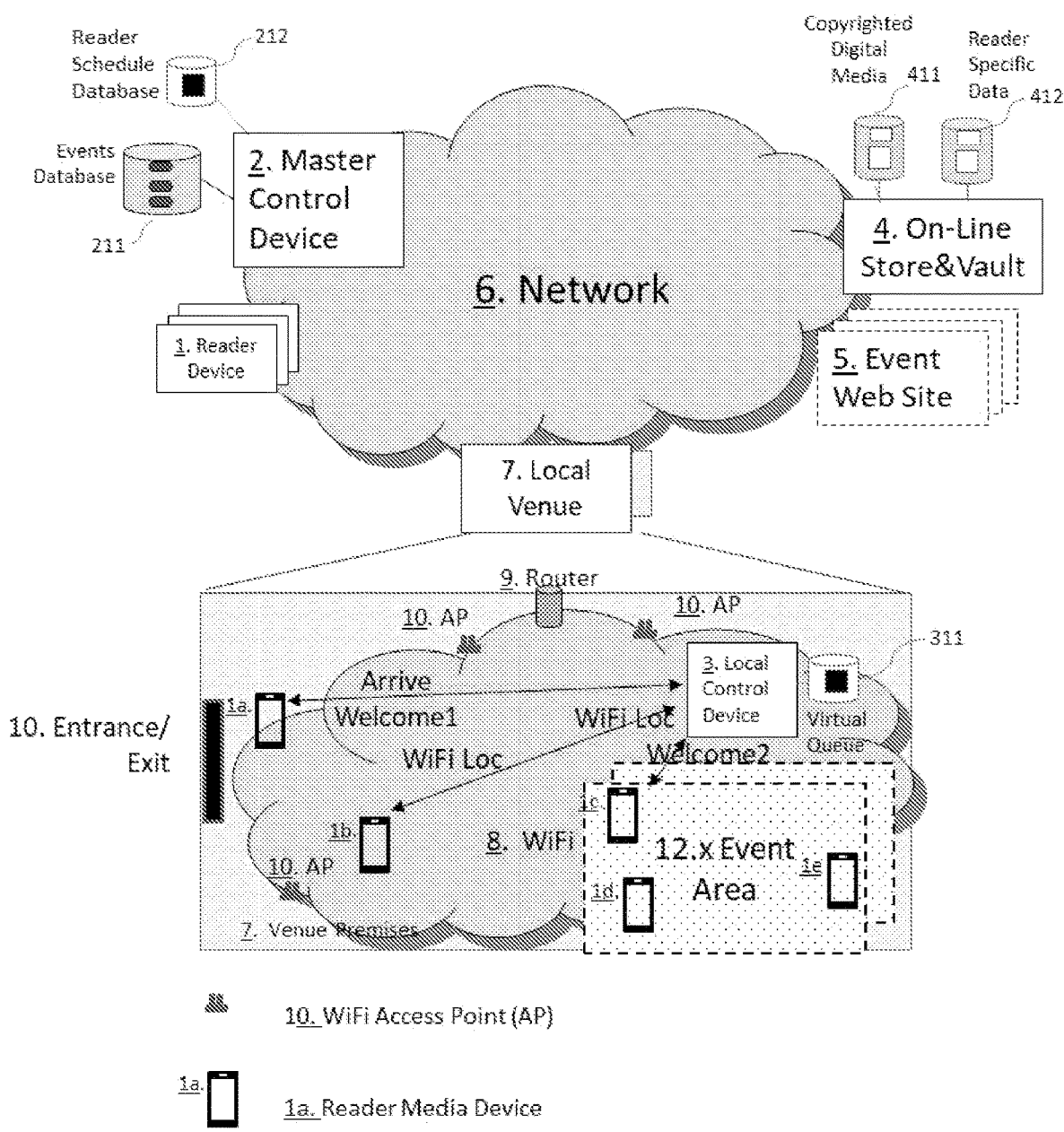
FIG. 23 depicts the Event Phase involving the reader arrival at a large event venue.

FIG. 23 depicts the reader's arrival at the 7 Local Venue entering through one the multiple entrance/exit points. For large venues such as convention centers, there will be many such points, e.g., ten to twenty points for entry and exit. Since multiple Service 1 and Service 2 events are conducted in parallel, large venues have many 12.*x* Event Areas. The number of such locations, x, will vary on the size of the event but typically ranges between ten and fifty. These locations may be on different floors in the 7 Local Venue and walking distance between locations may be ten to fifteen minutes. In contrast to small venues, the reader will have to spend time and effort to find the location of the relevant 12.*x* Event Areas for each registered event.

As described above for small venues the reader can quickly identify the 12 Event Area upon reaching the 7 Local Venue. This is not the case for large venues. Also, for large venues, reader may attend several events that may be held in different locations within the 7 Venue so the operation of the invention is different. Therefore, the 1 Reader Media Device is configured to transmit estimated time of arrivals (ETAs) to the 3 Local Control Device. The 3 Local Control Device sets the rate of update in the Welcome1 message.

The 120 Event Management component in the 1 Reader Device executes the Welcome-Arrival protocol based upon the Bookstore facilities information provided in the Registration message. The 1 Reader Device knows the venue 8 WiFi Username-Password either because it has been received in the Registration Confirmation Message or has been stored from previous visits to the venue. In either case, the 1 Reader Device is able to gain access the semi-public 8 WiFi.

It transmits an Arrival Message using the venue 8 WiFi with the Reader's Name, UserID, Event Registration Confirmation Number, Reader Device Hardware ID, Social Media ID of the Event (e.g., Twitter Name, Hashtag), and 1 Reader Device GPS Position to the 3 Local Control Device. Security parameters including the Registration Confirmation Number are encrypted using the reader private encryption key. Then the Arrival Message is encrypted using the 3 Local Control Device public key.

The 330 Line Control component in the 3 Local Control Device receives and processes this message. It decrypts the Arrival Message using its private key and decrypts the security parameters using the public key of the reader. It verifies the reader by matching the confirmation number. It updates the 311 Virtual Queue indicating that reader has arrived and responds with a Welcome Message. This message establishes the unique 1 Reader Device that will be used to generate the PMA.

The 3 Local Control Device generates a Welcome1 message turning on ETA reporting using indoor position data and the rate at which such data is reported. In order to compute the ETA, the 3 Local Control Device has stored a network representation of the venue layout, depicted in FIG. 24, and the x,y,z co-ordinates of all 12 Event Areas for which the reader has registered. These parameters are included in the Welcome1 message. The 3 Local Control Device transmits the Welcome1 Message to the 1 Reader Media Device. Security parameters encrypted and the text of the message encrypted with the 1 Reader Media Device Public Encryption key.

Upon receipt of the Welcome1 message, the 1 Reader Media Device decrypts the message using its Private Encryption Key and decrypts the message parameters using the 3 Local Control Device Public Key. It determines that the invention has been configured to operate in a large venue mode and must transmit ETAs. The 120 Event Management component sets the rate for transmission of such data.

Figure 24:
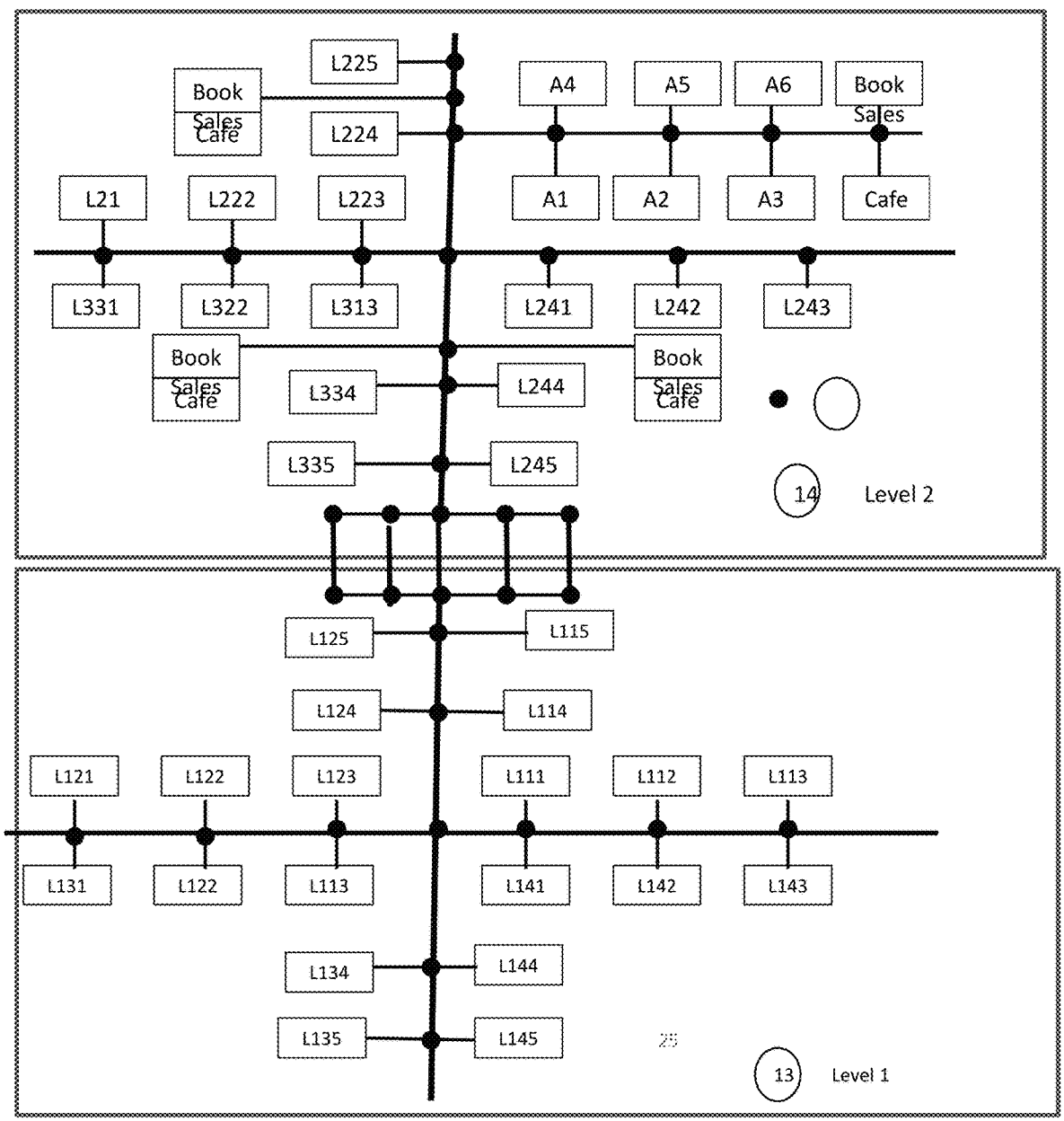
FIG. 24 depicts network map derived from a conceptual venue layout.

At a configurable time prior to the start of the event, the 115 Navigation Updater component in the 1 Reader Media Device begins computing its Estimated Time of Arrival (ETA) for each registered event using the pre-stored network map of the venue as illustrated in FIG. 24, location of the event, and configurable location threshold parameters. It derives its x-y-z location using WiFi indoor data, determines destination based on x-y-z data for the 12 Event Area provided in the Welcome 1 message, and computes distance between them on the stored network map. Based on the distance, it computes a walking time using configured walking time rates based on number of parameters including number of attendees, time of day. When the walking time approaches a threshold close to zero, the algorithm in the 1 Reader Media Device concludes that the ETA is the current time, i.e., reader has arrived at the 12 Event Area.

For each 1 Reader Media Device, the 3 Local Control Device maintains the next registered Service 1 or Service 2 event associated with that device. The 3 Local Control Device receives and stores the ETAs messages from the 1 Reader Media Device while the reader is present in the 7 Local Venue. The ETA is a parameter in the 311 Virtual Queue.

When the invention is configured for large venues, Service 2 is performed at a scheduled time rather than following an associated Service 1 event. Therefore, the order in which the reader attends the selected events is determined by the venue schedule, not by the bookstore tradition of a Service 1 followed by a Service 2.

When the 3 Local Control Device determines that 1 Reader Media Device has arrived at the 12 Event Area for the Service 2 event, the 3 Local Control Device begins the computation of the Line Control Number and generation of Welcome2 Message for the 1 Reader Media Device.

The LCN is computed using an algorithm that is configurable based on venue set parameters. The parameters may include the arrival time of the reader at the event, priorities derived from the Reservation Confirmation Number, value of the reader's purchase for the event, value of the purchases at the store during a configurable time period, e.g., at the event, during the previous year. Purchases may include books of any media or any other purchases at the store.

The arrival time may be used as well as the new parameter, the estimated arrival time computed using indoor position data. This allows a more flexible weighting of the arrival distribution. Some readers may be coming from an event nearby on the same level while others may be coming from an event on another level. The configurable algorithm has visibility into both and can schedule readers accordingly.

For example, the algorithm has knowledge that both readers are coming to the event and can schedule both. It may detect that the reader with the longer path may not arrive in time for the start of the collaboration. This is clear from the conceptual network map shown, FIG. 24. Readers coming from a Service 1 event on Level 2 to the Service 2 Event Area on Level 2 will certainly arrive more quickly than a reader coming from a Service 1 event on Level 1. Therefore, the algorithm will assign it a later collaboration even though it may be a more preferred reader having purchased more goods and services. Knowing the ETA, the algorithm can decide how much later the collaboration time of a preferred reader must be delayed.

Also, the algorithm may be configured to schedule readers according to their next event. For example in the conceptual venue with Service 2 collaboration on Level 2 depicted in FIG. 24, it may be beneficial to schedule the reader with a next event on Level 1 earlier than a reader with a next event on Level 2. This is especially true if the reader is attending a Service 1 event because the Service 2 collaboration can be delayed but a Service 1 information presentation cannot be delayed. The invention algorithm accommodates the hard and soft start time requirements in the look ahead to the next event in scheduling collaboration for book expos.

The 330 Line Control component in 3 Local Control Device computes and transmits the Line Control Number (LCN) in the Welcome2 Message to the 1 Reader Device. The LCN establishes the reader's place in queue for signing as it does for the traditional book signing, but for this case where readers may be coming from other events or going to other events, the invention includes more configurable algorithmic parameters.

After the 3 Local Control Device computes the LCN, it generates a Welcome2 message, transmits the Welcome2 Message to the 1 Reader Media Device with security parameters encrypted with the 3 LCD private encryption key and the text of the message encrypted with the 1 Reader Media Device Public Encryption key. The 3 Local Control Device also alerts venue personnel to provide any Special Services to the reader, e.g., provide a purchased hardcopy book, usher to reserved seating, or provide food and beverage service.

FIG. 17 discussed above illustrates the steps performed in Service 2, creation of a PMA. The creation of the PMA is the same as described above.

For Service 1 events in large venues for book expos, 3 Local Control Device generates and transmits a Welcome2 message when it has learned the 3 Reader Media Device has arrived at the 12 Event Area. Since Service 1 is an information presentation service and involves no collaboration, the Welcome2 message does not include an LCN.

The Shop While Wait feature applies for large venues as it does for small venues as described above. However, it is important that venue operators deploy sales and cafes areas close to Service 2 12 Event Areas such that when readers get the NEXT message they can quickly respond and collaborate with the author. If these areas are not nearby, the readers will lose valuable collaboration time.

8 ALTERNATIVE READER DEVICE EMBODIMENTS

The invention may be implemented using different embodiments of the 1 Reader Device depending upon invention phase and reader preferences. For example, rather than a smartphone, the reader may use a desktop computer or a laptop computer as a 1 Reader Device to access the 211 Event Database in order to identify events of interest. Such an event may be a Service 1, present event or a Service 2 event, or In this case, the 1 Reader Device (a PC) would include a Web 180 browser to access the database.

The reader could still use a smartphone to capture the PMA during the Event Phase. Alternatively, the reader could choose to use a tablet or laptop computer during the Event Phase depending upon personal preferences.

9 ALTERNATIVE LOCAL CONTROL DEVICE EMBODIMENTS

The invention may be implemented using different embodiments of the 3 Local Control Device depending upon invention phase and venue preferences. For example, rather than a tablet, the venue personnel may use a desktop computer or a laptop computer as a 3 Local Control Device to access the signing schedule in the 2 Master Control Device, interact with the 1 Reader Device, execute the 330 Line Control component that implements the Welcome-Arrival protocol, and execute any control commands.

In another scenario where there is a very large event with many users an alternate implementation of the 3 Local Control Device could be implemented as a client server model. The server is run on a high end server as shown in FIGS. 6 and 7 sized with sufficient processing power and storage based on the expected number of readers. The client would run the user interface which can be either an application or web based interface. The client hardware would be a tablet or laptop for portability.

10 ALTERNATIVE CONTROL EMBODIMENTS

In some situations, it may be more convenient for a third person (other than the reader or the author) to hold and control the device capturing the media data object. Such person may be the bookstore representative who may capture the media data object using the 3 Local Control Device.

Therefore, in this embodiment the 350 Camera Control component and 325 Signing Control component are resident in the 3 Local Control Device in order to generate and personalize the PMA.

The advantage of this embodiment is the physical ease of capturing the PMA. It provides the equivalent service of the recommended embodiment.

11 CLOUD EMBODIMENT

In this embodiment, the 3 Local Control Device is removed from the System Architecture. Then the Bookstore representative uses a web browser on a smartphone to a.) access the signing schedule in the 2 Master Control Device b) execute any control commands. This provides an equivalent service to the recommended embodiment.

The advantage of this embodiment is that it minimizes the data processing and storage infrastructure on the local bookstore. However, it is dependent on having network connectivity to the 2 Master Control Device.

12 REMOTE EMBODIMENT

Figure 25:
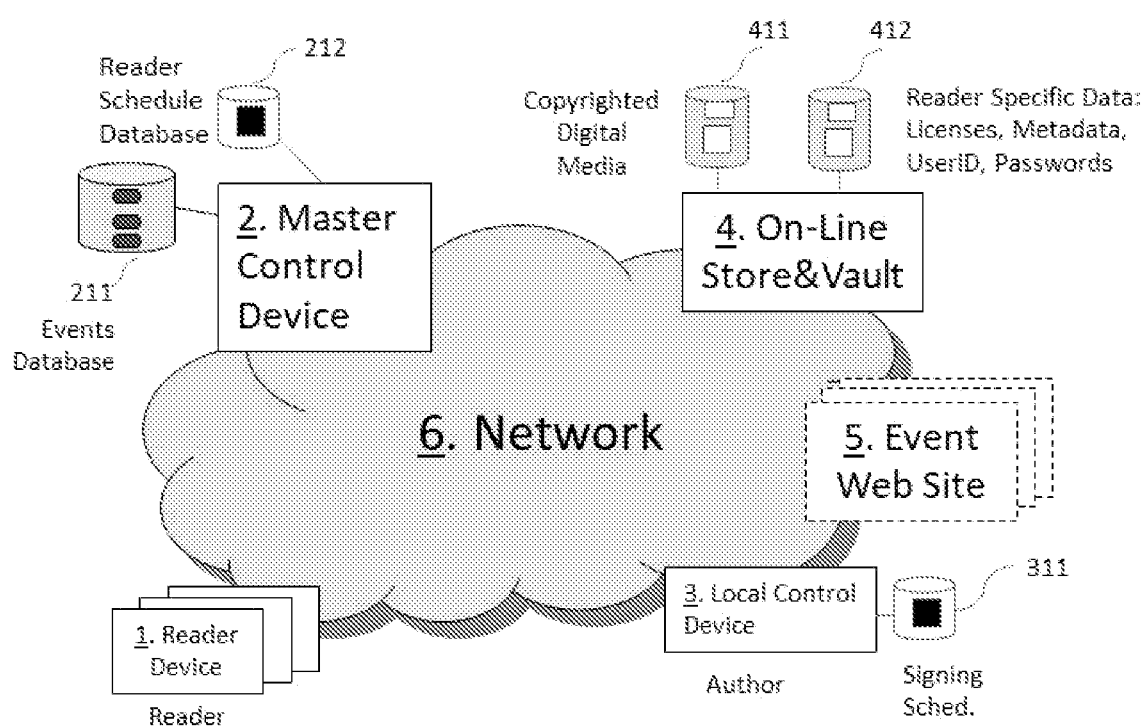
FIG. 25 depicts the Remote embodiment where the reader and author collaborate over the Internet. In this case, the author is co-located with the 3 Local Control Device.

FIG. 25 depicts the Remote embodiment where it is not practical for the reader and the author to meet in order to generate a PMA. Remote signing events are included in the Signings Event database, but denoted as remote. Readers may register for them like they would register for on premise events. Readers would also select the location for the PMA and the type of icon.

When the signing window begins, the reader and author would discuss the personalization details using electronic means. The media data object could be an image or a video of the author.

As shown in the figure, the author is co-located with 3 Local Control Device that utilizes the 320 Event Management component to schedule the signings of individual readers. It also uses the 350 Camera Control component and 325 Signing Control component to generate the PMA.

Hybrid embodiments are possible. For example, the remote embodiment and the cloud embodiment could be combined with the author using only a smartphone. This is a very attractive alternative because it minimizes the software infrastructure for the author.

This embodiment is a workaround and does not provide the full functionality of the recommended embodiment because it does not capture a media data showing both the reader and the author.

13 NON WIFI COMMUNICATIONS EMBODIMENTS

Almost all bookstores have WiFi networks, but some may not be so equipped. In this case network communications will be provided by texting for all messages and cellular for transmission of all media data objects.

This embodiment provides an equivalent service, but charges may be incurred and performance may be degraded.

14 ALTERNATIVE MEDIA EMBODIMENTS

While this description of the invention (as described in Sections 4 and 5) applies to specific photo and video data objects captured using a camera for ebooks, it can be extended to apply to other media applications including but not limited to the electronic album art of audio books, audio (MP3) and video (DVD) products.

15 CONCLUSIONS

This invention closes the business loop between retailers, publishers, and authors to provide a practical solution for the personalization of ebooks for both small venue where a single author conducts a presentation (referred to as an information presentation Service 1) and book signing (referred to as an a collaboration Service 2) as well as the more general case for large venues where many authors conduct Service 1 information presentation event and Service 2 collaboration signing events in parallel. It addresses the special cases where the event is authored by two individuals.

It provides an end-to-end control, and data management (CD&M) solution for the identification of event signings; capability for the readers and author to discuss the event on social media after readers have registered for the event allowing the author the tailor his/her comments at the event to the readers' interest; push invitations to identify events; feature to initiate a location independent social media conversation between the author and readers enabling them to discuss the book during the author's book tour; multimedia personalization of ebooks; line control so readers can browse the venue or mingle while waiting for collaboration with the author; synchronization and archival of the PMA among all of the reader's devices; special services such as reserved seating as well as food and beverage.

The line control feature of the invention utilizes an algorithm to provide venue operators the capability to efficiently manage the use of their facility. It provides them configurable parameters that include the arrival time of the reader at the event, expected arrival time of other readers to the event, the proximity of the readers' next event, next event type (Service 1 or 2), value of the readers' book purchase for the event, value of the readers' book purchases during a configurable time period, value of readers' other purchases during a configurable time, value of readers' other purchases. The social media feature is a very powerful capability because it enables readers to submit questions and comments to the author prior to the event. The Registration Confirmation Message is the catalyst to initiate the social media conversation between the author and the readers. In some cases, the author may be well known to the readers. However, in many cases, the event may be introducing readers to new authors.

This invention may be implemented using any one of several embodiments depending upon the business retailer's business environment. In the basic case described in this patent application, processing and storage of scheduling data may be resident at the local bookstore. However, it is envisioned with cloud computing technology processing and storage may evolve to the cloud for many retailers. Very often a smartphone will be used as a reader device, but a laptop or tablet device may also be used for collaboration with the author during PMA generation. If it is not convenient for the reader and author to physically meet, there is a remote embodiment of the invention.

While the simplest case of this invention is the embedding of a photo into an ebook, it also covers the embedding of other media such as audio or video into an ebook. Analogously, the invention also includes the embedding of such media into cover art of audio books, DVDs and MP3 albums.

While signing events have been traditionally viewed as free and open events, the special services feature of this invention provides the framework to make signing events the exclusive, paid events of the future. For example, paid book signing events may charge premium prices, but include deluxe services such as cocktails and dinner with the author in addition to the PMA.

In summary, this invention combines a novel set of ideas not previously available to retailers, publishers, and authors providing them new and promising business opportunities.

What is claimed:

1. A computer implemented method for a Control and Data Management (C&DM) for a plurality of events scheduled on a selected date and time performed in person at an event venue consisting of two types of services: an Information Delivery Service named Service 1 where all readers are serviced simultaneously, and a Collaboration Service named Service 2 where a reader is serviced sequentially for one-on-one service by an author of a book in creating a Personalized Multimedia Autograph (PMA) comprising the steps:
   a) a Server using an electronic processing and communications:
      i. after the reader has registered for Service 1 events and Service 2 events selected by the reader, sending a single Registration Confirmation Message to the reader that lists each event selected by the reader, and
      ii. creating a plurality of virtual queues comprising f a plurality of registered readers upon arrival by the reader at the event venue,
      iii. setting a service order of each virtual queue for Service 2 as readers arrive at a Service 2 event area,
   b) a Reader Media Device of the reader registered for such event using the electronic processing and communications:
      i. transmitting an arrival message after autonomously detecting arrival by the Reader Media Device at the event venue via a satellite positioning system using a venue WiFi network for any registered event,
      ii. generating and transmitting an estimated arrival time using the venue WiFi network prior to each Service 1 and Service 2 event to the Server for a configurable time period,
      iii. notifying the Server when a collaboration window has been completed,
      iv. notifying the Server when a set of parameters for an autograph page window have been selected and the PMA created,
   c) the Server using the electronic processing and communications:
      i. transmitting a Welcome1 Message confirming arrival of said registered readers at the event venue,
      ii. receiving the estimated arrival time to the Service 2 event area from each Reader Media Device,
      iii. upon arrival by the reader at the Service 2 event area, computing a Line Control Number (LCN) that specifies a service order for each selected Service 2 in the virtual queue,
      iv. transmitting a Welcome2 Message with the LCN to the Reader Media Device,
      v. updating a reader service status upon completion of each reader-author collaboration with an actual collaboration end time,
   d) when a Session 2 Service involves a reader-coauthor collaboration with one coauthor and an other coauthor(s), the Server using the electronic processing and communications:
      i. partitioning the registered readers into a set of two groups for collaboration with each coauthor,
      ii. computing the LCN for each reader that specifies the service order for collaboration in that reader's group,
      iii. after the reader completes collaboration with one coauthor, computing the LCN for collaboration with the other coauthor,
      iv. updating the virtual queue by adding the reader to the virtual queue of the other coauthor,
      v. transmitting a second Welcome2 Message with a new LCN to the Reader Media Device,
      vi. updating the reader service status in the virtual queue upon completion of each reader-coauthor collaboration with the actual collaboration end time,
   e) the Server using the electronic processing and communications:
      i. initiating Service 2,
      ii. computing a Collaboration Window comprising a start time and a maximum allowable end time for each reader-author collaboration, and
      iii. notifying each reader when the reader is next in line to collaborate with the author,
   f) the Server using the electronic processing and communications:
      i. setting a configurable time period for an autograph page window for setting PMA autograph page parameters that specify how and where the PMA will be inserted into electronic media content,
      ii. transmitting said parameters to the Reader Media Device,
   g) the Server using the electronic processing and communications issuing a Push Invitation to the reader initiated by the reader clicking on a specific book while browsing an On-Line Store and Vault (OLV) subject to:
      i. an event check that a reader-author collaboration Service 2 will be held for such an ebook based on author availability, book publication date and book type, and
      ii. a proximity check verifying the reader and the event venue is within a configured travel time,
   h) the Server using the electronic processing and communications initiating a multi-event social media conversation discussing an author's book generated by a location independent handle and hashtag in the single Registration Confirmation Message sent to all readers on the author's book tour,
   i) the Server using the electronic processing and communications:
      i. receiving a Purchase Request Message for a selected venue item or items with associated venue inventory parameter(s) converted from an identifying code(s) from the Reader Media Device while reader is in a virtual queue for Service 2 awaiting collaboration with the author,
      ii. computing a discount on said item using an algorithm based on the LCN of the reader and configured parameters, iii. generating and transmitting a Purchase Response Message with price(s) and an embedded discount coupon to the Reader Media Device for executing purchase of item(s) at reader request using either 1.) an electronic transaction purchasing a selected venue item or item(s) or 2.) a physical transaction at a venue check out location.

2. The computer implemented method for the C&DM of claim 1 comprising the steps using the electronic processing and communications:
   a. scanning a configured set of Internet Web sites of event venues that conduct Service 1 and Service 2 events,
   b. identifying a set of Service 1 and Service 2 event data on the Internet web site of the event venues in a calendar format specified in days, weeks, months,
   c. retrieving the Service 1 and Service 2 event data including the author, an ebook title, a venue name, a venue location, calendar date and time,
   d. identifying Service 2 events conducted by coauthors where readers collaborate with both coauthors,
   e. storing the event data in an Events Database, and
   f. making the Service 1 and Service 2 event data available for reader access.

3. The computer implemented method for the C&DM of claim 1 comprising the steps:
   a. the Reader Media Device using the electronic processing and communications
      i. accessing the Events Database,
      ii. transmitting a Registration Request Message for selected Service 1 and Service 2 events containing a reader identification parameter comprising a UserID, a password, and a reader security parameter comprising a reader public encryption key to the Server,
   b. the Server using the electronic processing and communications:
      i. receiving and processing the Registration Request Message for Service 1 and or Service 2 events,
      ii. checking service capacity for the selected Service 1 and Service 2 events,
      iii. for events with available service capacity, generating a single semantic based registration confirmation number,
      iv. for events with available service capacity, generating said Registration Confirmation Message with the registration confirmation number, venue WiFi access parameters, and a Server security parameter comprising a Server public encryption key,
      v. storing the registration parameters in a Reader Schedule Database,
      vi. transmitting the Registration Confirmation Message,
   c. the Reader Media Device using the electronic processing and communications:
      i. receiving the Registration Confirmation Message for selected Service 1 and Service 2 events,
      ii. storing all parameters of the Registration Confirmation Message,
         iii. upon reader command displaying only the Service 1 and Service 2 event related parameters in the Registration Confirmation Message.

4. The computer implemented method for the C&DM of claim 1 comprising the steps:
   a) the Server using the electronic processing and communications:
      i. establishing said virtual queue for each Service 2 event on the day of the event with a set of configured parameters that include a reader name, a Reader Media Device ID, the Reader Service Status, and the Line Control Number,
      ii. initiating the reader-author collaboration after a corresponding Service 1 has been completed or at a scheduled time,
      iii. setting the configured start time and the end time of the Autograph Page Window for each reader specifying PMA parameters before, during, or after the event,
      iv. transmitting these parameters to the Reader Media Device in the Reservation Confirmation Message,
   b) the Reader Media Device using the electronic processing and communications:
      i. computing the estimated arrival time using a set of WiFi indoor position data, a pre-stored venue map, a location of the Service 2 event area, and a set of configured venue walking rates, and
      ii. using the location of the Service 2 event area and a configurable arrival threshold determining when the reader has arrived at the Service 2 event area and,
      iii. generating and transmitting the estimated arrival time message to the server,
   c) the Server using the electronic processing and communications:
      i. computing the LCN parameter used for scheduling Service 2 collaboration using an algorithm with configurable parameters that include an actual arrival time of the reader at the event, estimated arrival time of other readers to the event proximity of the readers' next event, next event type specified as Service 1 or 2, value of the purchases by readers for the event, value of the book purchases by readers during a configurable time period, value of other purchases by readers during a configurable time, value of other purchases by readers,
      ii. generating the Welcome2 Message with the LCN and securely transmitting the Welcome2 Message to the Reader Media Device encrypted using the reader public encryption key,
   d) the Server using the electronic processing and communications:
      i. computing the Collaboration Window comprising the start time and the end time for each reader-author collaboration based on the LCNs, a number of registered readers, and an estimated PMA creation time, and
      ii. notifying each reader when that reader is next in line to collaborate with the author.

5. The computer implemented method for the C&DM of claim 1 for said reader-coauthor collaboration with one coauthor and other coauthor comprising the steps:
   a) the Server using the electronic processing and communications:
      i. establishing virtual queues for each Service 2 for the reader-coauthor collaboration on the day of the event with one virtual queue for each coauthor with said set of configured parameters that includes the reader name, Reader Media Device ID, Reader Service Status, Line Control Number,
      ii. initiating the reader-coauthor collaboration after Service 1 has been completed or at said scheduled time,
      iii. setting the configured start time and the end time of the Autograph Page Window for each reader specifying a set of PMA parameters before, during, or after the event, iv. transmitting the PMA parameters to the Reader Media Device in the Registration Confirmation Message, b) the Reader Media Device using the electronic processing and communications:
  i. computing an estimated arrival time using the WiFi indoor position data, a pre-stored venue map, location of the event area, and configured venue walking rates, and
  ii. using the location of the event area and the configurable arrival threshold determining when the reader has arrived at the event area,
  iii. generating and transmitting the estimated arrival time message to the server, c) the Server using the electronic processing and communications:
  i. for each reader registered for a Service 2 with coauthors, assigning of reader to the virtual queue of one coauthor,
  ii. computing the reader Line Control Number (LCN) parameter for insertion in the Welcome2 Message and for Service 2 collaboration using an algorithm with configurable parameters that include the actual arrival time of the reader at the event, expected arrival time of other readers to the event, the proximity of the readers' next event, next event type being Service 1 or 2, value of the book purchase by the readers for the event, value of the book purchases by the readers during a configurable time period, value of other purchases by the readers during a configurable time, value of other purchases by the readers,
  iii. securely transmitting the Welcome2 Message encrypted using the reader public encryption key, d) the Server using the electronic processing and communications:
  i. computing the Collaboration Window comprising start time and end time for each reader-coauthor r collaboration based on the LCNs, number of registered readers, and estimated PMA creation time and,
  ii. notifying each reader when that reader is next in line to collaborate with the coauthor, e) after completing service on first coauthor, the Server
  i. assigning the reader's parameters to the virtual queue of the other coauther,
  ii. computing the LCN parameter for the Welcome2 Message for Service 2 events using an algorithm with configurable parameters that include the arrival time of the reader at the event, expected arrival time of other readers to the event, the proximity of the readers' next event, next event type having a hard start time Service 1 or soft start Service 2, value of the book purchase by the readers for the event, value of the book purchases by the readers during a configurable time period, value of other purchases by the readers during a configurable time, value of other purchases by the readers and,
  iii. securely transmitting the Welcome2 Message encrypted using the reader public encryption key.

6. The computer implemented method for the C&DM of claim 1 comprising the steps: uniquely identifying personalized PMAs created at events during collaboration windows by assigning and storing in the Reader Schedule database a set of unique parameters identifying the PMA for each reader: book title, author name, event venue name and location, date, an ebook license number and start time and actual collaboration end time for the collaboration window defined as time the PMA was approved by the reader or time maximum number of attempts reached and then reader service status updated.

7. The computer implemented method for the C&DM of claim 1 comprising the steps: creating the PMA where the author and reader collaborate using a single Reader Media Device provided by the reader with the assistance of a third person and a Server operating in the background transparent to both the reader and the author.

8. The computer implemented method for the C&DM of claim 1 comprising the steps:
  a. the OLV using the electronic processing and communications performing the event checks on books that said event providing reader-author collaboration may be held for a book based on author availability, publication date, and type of book for books identified by the reader while browsing the OLV,
  b. the OLV using the electronic processing and communications identifying another set of related candidate books for providing reader-author collaboration based on the author name, book genre, and publication date,
  c. the OLV using the electronic processing and communications notifying the server for all identified books that pass the event checks,
  d. the Server using the electronic processing and communications using the electronic processing and communications accessing the Events Database and performing the proximity check based on a computed travel time measured by driving, walking, or using public transportation between the reader location and venue using the electronic processing and communications, and
  e. the Server using the electronic processing and communications issuing said push invitation to the reader for all events passing the proximity check.

9. The computer implemented method for the C&DM of claim 1 comprising the steps using the electronic processing and communications:
  a. specifying said location independent social media handle and hashtag to initiate said multi-event social media conversation of geographically distributed readers for the event and all events on the author's book tour regarding the book, b. inserting the location independent social media handle and hashtag into the Registration Confirmation Message transmitted by the Server to the reader.

10. The computer implemented method for the C&DM of claim 1 comprising the steps:
  a. while the reader is in said a Service 2 virtual queue for Service 2, Reader Media Device using the electronic processing and communications scanning an identifying code of said a selected venue item or items of reader interest,
  b. the Reader Media Device using the electronic processing and communications converting said identifying codes to a digital format,
  c. the Reader Media Device using the electronic processing and communications receiving delivery parameters entered by reader including a delivery format specifying electronic or physical delivery, quantity, and an address specifying email or physical addresses or reader pickup,
  d. the Reader Media Device using the electronic processing and communications generating and securely transmitting said Purchase Request Message to Server with said identifying digital code(s), LCN of the reader, and delivery parameters to Server, e. the Server using the electronic processing and communications looking up a venue item(s) nominal prices in a venue database based on item digital code(s), f. the Server using the electronic processing and communications computing a net venue item price(s) with said discount using algorithm based on LCN of the reader rewarding reader with larger discount with larger LCN, nominal item price(s), item popularity, item margin, and a set of configured parameters including past purchases by the reader at the event venue and at the event of books, other goods, and services, g. the Server using the electronic processing and communications generating and securely transmitting said Purchase Response Message with the embedded discount coupon to Reader Media Device, h. the Reader Media Device using the electronic processing and communications receiving said Purchase Response Message and displaying said net venue item price with discount to reader, i. the Reader Media Device using the electronic processing and communications:
 i. displaying the coupon at the venue check out location as part of said physical transactions for purchase of one or more of the selected venue item(s),
 ii. transmitting the embedded discount coupon as part of said electronic transaction with the OLV for purchase of one or more of the selected venue item(s) using the embedded discount coupon.

11. An electronic system for a Control and Data Management (C&DM) for a plurality of events scheduled on a selected date and time performed in person at an event venue consisting of two types of services: an Information Delivery Service named Service 1 where all readers are serviced simultaneously and a Collaboration Service named Service 2 where a reader is serviced sequentially for one-on-one service by an author of a book in creating a Personalized Multimedia Autographs (PMA) comprising the following steps:

a. a Reader Media Device with 1.) an attached touchscreen for input and output including a PMA display, 2.) a photo or video camera to capture a media data object, 3.) an application processor with memory for a reader registered for said events using an electronic processing and communications:
 i. transmitting an arrival message upon autonomously detecting arrival at the event venue via a satellite positioning system using a venue WiFi network for any registered event,
 ii. generating and transmitting an estimated arrival time using the venue WiFi prior to each Service 1 and Service 2 event to a Local Control Device for a configurable time period,
 iii. notifying the Local Control Device when a collaboration window has been completed, notifying the Local Control Device when a set of parameters for an autograph page window have been selected and the PMA created, b. the Local Control Device with 1.) an attached touchscreen to control and manage a set of PMA applications, 2.) a network interface to communicate with the Reader Media Device and a Master Control Device, 3.) an application processor with memory executing a set of PMA applications that after said events have has been scheduled, c. the Local Control Device using the electronic processing and communications:
 i. transmitting a Welcome1 Message confirming arrival of a plurality of registered readers at the event venue for Service 1 and Service 2 events,
 ii. creating a plurality of virtual queues of registered readers,
 iii. receiving the estimated arrival time to the Service 2 event area from each Reader Media Devices prior to each Service 1 and Service 2 event for a configurable period of time,
 iv. upon arrival at the event area by the reader, computing a Line Control Number (LCN) that specifies a service order of reader for each selected Service 2 in the virtual queue,
 v. transmitting a Welcome2 Message with the LCN to the Reader Media Device,
 vi. updating a reader service status in the virtual queue upon completion of each reader-author collaboration, d. When a Session 2 Service involves a reader-coauthor collaboration with one coauthor and an other coauthor, the Local Control Device using the electronic processing and communications:
 i. partitioning the registered readers into a set of two groups for collaboration with each coauthor,
 ii. computing the LCN for each reader that specifies the service order for the reader for collaboration in that reader's group,
 iii. after the reader completes collaboration with one coauthor, computing an LCN for collaboration with the other coauthor, iv. updating the virtual queue by adding the reader to the virtual queue of the other author,
 v. transmitting a second Welcome2 Message with a new LCN to the Reader Media Device,
 vi. updating the reader service status upon completion of each reader coauthor collaboration, e. the Local Control Device using the electronic processing and communications:
 i. initiating computing the collaboration window comprising start time and maximum allowable end time for each reader- and author collaboration, and
 ii. notifying each reader when the reader is next in line to collaborate with the author, f. the Local Control Device using the electronic processing and communications:
 i. setting a configurable time period for PMA autograph page window for setting PMA autograph page parameters that specify how and where the PMA will be inserted into electronic media content using electronic processing and content,
 ii. transmitting said parameters to the Reader Media Device, g. a Master Control Device with 1.) a set of CPU blades with memory and a database management system and 2.) a network interface to communicate with an OnLine Store and Vault (OLV) and Local Control Device using the electronic processing and communications:
 i. constructing and storing an Events Database;
 ii. constructing and storing a Reader Schedule Registration database;
 iii. after the reader has registered for selected Service 1 and Service 2 events, sending a single Registration Confirmation Message to the Reader Media Device that lists each selected event;
 iv. transmitting a Push Invitations to the reader subject to an event check that a reader-author collaboration Service 2 will be held for such an ebook based on author availability, book publication date and book type and a proximity check of reader and the event venue is within a configured travel time;
v. and initiating a multi-event social media conversation discussing an author's book generated by a location independent handle and hashtag in the Registration Confirmation Message sent to all readers on an author's book tour ,
h. the Local Control Device using the electronic processing and communications:
i. receiving a Purchase Request Message for a selected venue item or items with associated venue inventory parameter(s) converted from an identifying code(s) from a Reader Media Device while reader is in said virtual queue awaiting collaboration with the author,
ii. computing a discount on said item using an algorithm based on the LCN of the reader and configured parameters,
iii. generating and transmitting a Purchase Response Message with price(s) and an embedded discount coupon to the Reader Media Device for executing purchase of item(s) at reader request using either a.) an electronic transaction purchasing selected venue item(s) or b.) a physical transaction at a venue check out location.

12. The electronic system of claim 11 wherein the Master Control Device performs C&DM using the electronic processing and communications comprises:
a. scanning a configured set of venue Internet Web sites of venues that conduct Service 1 and Service 2 events,
b. identifying a set of Service 1 and Service 2 event data on the venue Internet web site of the event venues in calendar format specified in days, weeks, months,
c. retrieving the Service 1 and Service 2 event data including an author name, ebook title, venue location, calendar date and time,
d. identifying Service 2 events conducted by coauthors where readers collaborate with both authors,
e. storing the data in the Events Database, and
f. making the Service 1 and Service 2 data available for reader access using.

13. The electronic system for the C&DM of claim 11 that performs C&DM wherein:
a. the Reader Media Device performing C&DM using the electronic processing and communications comprises
i. accessing the Events Database of event signings,
ii. transmitting a Rregistration Request Message for a signing event containing a reader identification parameter comprising a UserID, a password, and a reader security parameter comprising a reader public encryption key to the Master Control Device,
b. the Master Control Device performing C&DM using the electronic processing and communications comprises:
i. receiving and processing the reader registration request for Service 1 and or Service 2 events,
ii. transmitting an Event Registration Message to the Local Control Device checking available service capacity for the selected Service 1 and Service 2 events,
iii. receiving a Response Event Registration Message from the Local Control Device,
iv. for events with available service capacity, generating a single semantic based registration confirmation number,
v. for events with available service capacity, transmitting said Registration Confirmation Message with registration confirmation number, venue WiFi access parameters, and a Local Control Device security parameter comprising a Local Control Device public encryption key to the Reader Media Device,
c. the Master Control Device performing C&DM using the electronic processing and communications comprises creating and storing a registration queue of registered readers for the event in the Reader Schedule database,
d. the Reader Media Device using the electronic processing and communications
i. receiving the Registration Confirmation Message for selected Service 1 and Service 2 events,
ii. storing all of the Registration Confirmation Message parameters,
iii. upon reader command displaying only the Service 1 and Service 2 event related parameters Registration Confirmation Message.

14. The electronic system of claim 11 performs C&DM wherein:
the Local Control Device using the electronic processing and communications:
i. establishes said virtual queue for each Service 2 event on the day of the event a set of configured parameters that include a reader name, a Reader Media Device ID, Reader Service Status, and Line Control Number,
ii. initiates the reader-author Service 2 collaboration after a corresponding Service 1 has been completed or at a scheduled time,
iii. sets a configured start time and an end time of the Autograph Page Window for each reader specifying a set of PMA parameters before, during, or after the event,
iv. and transmits the parameters to the Reader Media Device in the Reservation Confirmation Message,
b. the Reader Media Device using the electronic processing and communications:
i. computes the estimated arrival time using a set of WiFi indoor position data, a pre-stored venue map, a location of the Service 2 event area, and said set of configured venue walking rates, and
ii. using the location of the event area and a configurable arrival threshold determines when the reader has arrived at the event area and,
iii. generates and transmits an estimated arrival time message to the Local Control Device,
c. the Local Control Device using the electronic processing and communications:
i. computes the Line Control Number parameter used for scheduling Service 2 collaboration using an algorithm with configurable parameters that include an actual arrival time of the reader at the event, estimated arrival time of other readers to the event, proximity of the readers' next event, next event type having a hard start time for Service 1 or soft start time for Service 2, value of book purchase by readers for the event, value of book purchases by readers during a configurable time period, value of other purchases by readers during a configurable time, value of other purchases by readers,
ii. generates the Welecome2 and securely transmits the Welcome2 Message to the Reader Media Device encrypted using the reader public encryption key, d. the Local Control Device using the electronic processing and communications:
  i. computes the Collaboration Window comprising start time and end time for each reader-author collaboration based on the readers' LCNs, number of registered Readers, and an estimated PMA creation time, and
  ii. notifies each Reader when that Reader is next in line to collaborate with the author.

15. The electronic system of claim 11 performs C&DM for said reader-coauthor-collaboration with one coauthor and other coauthor wherein:
  a. the Local Control Device using the electronic processing and communications:
    i. establishes virtual queues for each Service 2 with co-authors collaboration on the day of the event with one virtual queue for each coauthor with said set of configured parameters that includes the reader name, Reader Media Device ID, Reader Service Status, Line Control Number,
    ii. initiates the reader-coauthor collaboration after Service 1 has been completed or at said scheduled time,
    iii. sets the configured start time and the end time of the Autograph Page Window for each reader specifying PMA parameters before, during, or after the event,
    iv. transmits the parameters to the Reader Media Device in the Registration Confirmation Message,
  b. the Reader Media Device using the electronic processing and communications:
    i. computes the estimated arrival time using the set of WiFi indoor position data, pre-stored venue map, location of the event area, and set of configured venue walking rates, and
    ii. using the location of the event area and the configurable threshold determining when the reader has arrived at the event area,
    iii. generates and transmits the estimated time of arrival message to the server,
  c. the Local Control Device using the electronic processing and communications:
    i. assigns the reader to a virtual queue of one coauthor for each reader registered for a Service 2 with coauthors,
    ii. computes the Line Control Number parameter for insertion in the Welcome2 Message and for Service 2 collaboration using an algorithm with configurable parameters that include the actual arrival time of the reader at the event, expected arrival time of other readers to the event, proximity of the readers' next event, next event type specified as being Service 1 with a hard start time or Service 2 with a soft start time, value of book purchase by the readers for the event, value of book purchases by the readers during a configurable time period, value of other purchases by the readers during a configurable time, value of other purchases by the readers and,
    iii. securely transmits the Welcome2 Message encrypted using the reader public key,
  d. the Local Control Device using the electronic processing and communications:
    i. computes the scheduled Collaboration Window comprising start time and end time for each reader-coauthor collaboration based on the readers' LCNs, number of registered readers, and estimated PMA creation time, and,
    ii. notifies each reader when that reader is next in line to collaborate with the coauthor,
  e. the Local Control Device after completing service on first coauthor using the electronic processing and communications:
    i. assigns reader's parameters to the virtual queue of the other author,
    ii. computes the LCN parameter for the Welcome2 Message for Service 2 events using an algorithm with configurable parameters that include the actual arrival time of the reader at the event, estimated arrival time of other readers to the event, the proximity of the readers' next event, next event type Service 1 with a hard start time or Service 2 with a soft start time, value of the book purchase by the readers for the event, value of the book purchases by the readers during a configurable time period, value of other purchases by the readers during a configurable time, value of other purchases by the readers, and
    iii. securely transmits the Welcome2 Message encrypted using the reader public encryption key.

16. The electronic system of claim 11 performs PMA C&DM using the electronic processing and communications during ebook signing events by uniquely identifying personalized PMAs created at events during collaboration windows by assigning and storing in the Reader Schedule database a set of unique parameters identifying the PMA for each reader: book title, author name, event venue name and location, calendar date, an ebook license number, and start time and actual end time for the collaboration window defined as time the PMA was approved by the reader or time maximum number of attempts reached and then reader service status updated.

17. The electronic system of claim 11 performs C&DM by creating the PMA where the author and reader collaborate using a single Reader Media Device provided by the reader with the assistance of a third person and the Local Control Device and Master Control Device operate in the background transparent to both the reader and the author.

18. The electronic system of claim 11 comprising using the electronic processing and communications:
  a. the OLV performing the event checks on books that said event providing reader-author collaboration may be held for a book based on author availability, publication date, and type of book for books identified by the reader while browsing the OLV,
  b. the OLV identifying another set of related candidate books for Service 2 events based on the author name, book genre, and publication date,
  c. the OLV notifying the Master Control Device for all identified books that pass the event checks,
  d. the Master Control Device accessing the Events Database and performing the proximity check based on a computed travel time measured by driving, walking, or using public transportation between the reader location and venue, and
  e. the Master Control Device issuing said push invitation to the Reader Media Device for all events passing the event check and proximity check using.

19. The electronic system of claim 11 comprising the steps using the electronic processing and communications:
  a. specifying said location independent social media handle and hashtag to initiate a multi-event social media conversation of geographically distributed readers for the event and all events on the author's tour regarding the book, b. the Master Control Device inserting the location independent social media handle and hashtag into the Registration Confirmation Message and transmitted to the Reader Media Device.

20. The electronic system of claim 11 comprising the steps:
   a. while the reader is in a virtual queue, the Reader Media Device using the electronic processing and communications scanning an identifying code of said selected venue item or items of reader interest,
   b. the Reader Media Device using the electronic processing and communications converting identifying codes to a digital format,
   c. the Reader Media Device using the electronic processing and communications receiving delivery parameters entered by reader including a delivery format specifying electronic or physical delivery, a quantity, and an address specifying email, physical or pickup,
   d. the Reader Media device using the electronic processing and communications generating and securely transmitting said Purchase Request Message to the Local Control Device with said identifying digital code(s), LCN, and delivery parameters to the Local Control Device,
   e. the Local Control Device using the electronic processing and communications looking up a venue item(s) nominal prices in a venue database based on item digital code(s),
   f. the Local Control Device using the electronic processing and communications computing a net venue item price(s) with said discount using algorithm based on LCN rewarding reader with larger discount with larger LCN, nominal item price(s), item popularity, item margin, and a set of configured parameters including past purchases by the reader at the event venue and at the event of books, other goods, and services,
   g. the Local Control Device using the electronic processing and communications generating and securely transmitting said Purchase Response Message with the embedded discount coupon to Reader Media Device,
   h. the Reader Media Device using the electronic processing and communications:
      i. receiving said Purchase Response Message and displaying discount to reader, displaying the coupon at the venue checkout location as part of said physical transactions for purchase of one or more of the selected venue item(s),
      ii. transmitting the embedded discount coupon as part of said electronic transaction with the OLV for purchase of one or more of the selected venue item using the embedded discount coupon.

* * * * *